US008484126B2

(12) United States Patent
Milne et al.

(10) Patent No.: US 8,484,126 B2
(45) Date of Patent: *Jul. 9, 2013

(54) LEG PRICER

(75) Inventors: Andrew Milne, Maplewood, NJ (US); Aleksander Sedlin, Brooklyn, NY (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,315

(22) Filed: Jul. 16, 2012

(65) Prior Publication Data

US 2013/0006830 A1    Jan. 3, 2013

Related U.S. Application Data

(63) Continuation of application No. 12/579,118, filed on Oct. 14, 2009, now Pat. No. 8,229,838.

(51) Int. Cl.
*G06Q 40/00* (2012.01)
(52) U.S. Cl.
USPC .......................................................... 705/37
(58) Field of Classification Search
CPC .................................................... G06Q 40/00
USPC .......................................................... 705/37
See application file for complete search history.

(56) References Cited

U.S. PATENT DOCUMENTS

| 4,677,552 A | 6/1987 | Sibley, Jr. |
| 4,903,201 A | 2/1990 | Wagner |
| 4,980,826 A | 12/1990 | Wagner |
| 5,500,812 A * | 3/1996 | Saishi et al. ................. 708/551 |
| 5,787,402 A | 7/1998 | Potter et al. |
| 6,021,397 A | 2/2000 | Jones et al. |
| 6,047,274 A | 4/2000 | Johnson et al. |
| 6,317,727 B1 | 11/2001 | May |
| 6,321,212 B1 | 11/2001 | Lange |
| 6,347,307 B1 | 2/2002 | Sandhu et al. |
| 6,356,911 B1 | 3/2002 | Shibuya |
| 6,405,180 B2 | 6/2002 | Tilfors et al. |
| 6,418,419 B1 | 7/2002 | Nieboer et al. |
| 6,421,653 B1 | 7/2002 | May |

(Continued)

FOREIGN PATENT DOCUMENTS

| EP | 0407026 A2 | 1/1991 |
| EP | 0411748 A2 | 2/1991 |

(Continued)

OTHER PUBLICATIONS

Bol/shev, L.N.: Least Square, Method of, Springer Link, Encyclopaedea of Mathematics, 2001, pp. 1-7.*

(Continued)

*Primary Examiner* — Bijendra K Shrestha
(74) *Attorney, Agent, or Firm* — Lempia Summerfield Katz LLC

(57) ABSTRACT

An electronic trading system utilizes a Match Engine that receives orders, stores them internally, calculates tradable combinations and advertises the availability of real and implied orders in the form of market data. The tradable combinations may include spread orders where one leg of the spread has a different tick size than the other or where the tick of the spread contract is different from the tick size in one or both legs. A method and system for calculating on-tick leg prices in an equitable and predictable manner is provided.

20 Claims, 16 Drawing Sheets

U.S. PATENT DOCUMENTS

| | | |
|---|---|---|
| 6,618,707 B1 | 9/2003 | Gary |
| 6,658,393 B1 | 12/2003 | Basch et al. |
| 6,721,715 B2 | 4/2004 | Nemzow |
| 6,829,589 B1 | 12/2004 | Saliba |
| 6,996,540 B1 | 2/2006 | May |
| 7,039,610 B2 | 5/2006 | Morano et al. |
| 7,043,457 B1 | 5/2006 | Hansen |
| 7,089,206 B2 | 8/2006 | Martin |
| 7,092,919 B2 * | 8/2006 | Bergenudd .................... 705/400 |
| 7,130,789 B2 | 10/2006 | Glodjo et al. |
| 7,177,833 B1 | 2/2007 | Marynowski et al. |
| 7,194,481 B1 | 3/2007 | Van Roon |
| 7,231,363 B1 | 6/2007 | Hughes et al. |
| 7,246,092 B1 | 7/2007 | Peterson et al. |
| 7,260,554 B2 | 8/2007 | Morano et al. |
| 7,280,481 B2 | 10/2007 | Rong |
| 7,299,208 B1 | 11/2007 | Bailon et al. |
| 7,542,937 B1 | 6/2009 | Cohen |
| 7,542,940 B2 | 6/2009 | Burns et al. |
| 7,542,941 B1 | 6/2009 | Cohen |
| 7,548,882 B1 | 6/2009 | Pazner |
| 7,685,052 B2 | 3/2010 | Waelbroeck et al. |
| 7,873,564 B1 * | 1/2011 | Stevens et al. .................. 705/37 |
| 7,933,827 B2 | 4/2011 | Richmann et al. |
| 2001/0042785 A1 | 11/2001 | Walker et al. |
| 2001/0056398 A1 | 12/2001 | Scheirer |
| 2002/0002530 A1 | 1/2002 | May |
| 2002/0035531 A1 | 3/2002 | Push |
| 2002/0070915 A1 | 6/2002 | Mazza |
| 2002/0077947 A1 | 6/2002 | Ward et al. |
| 2002/0099651 A1 | 7/2002 | May |
| 2002/0116314 A1 | 8/2002 | Spencer et al. |
| 2002/0116317 A1 | 8/2002 | May |
| 2002/0156719 A1 | 10/2002 | Finebaum et al. |
| 2002/0169774 A1 | 11/2002 | Greenbaum et al. |
| 2002/0178102 A1 | 11/2002 | Scheinberg et al. |
| 2002/0194115 A1 | 12/2002 | Nordlicht et al. |
| 2003/0004899 A1 | 1/2003 | Bergenudd |
| 2003/0009419 A1 | 1/2003 | Chavez et al. |
| 2003/0023542 A1 | 1/2003 | Kemp et al. |
| 2003/0033240 A1 | 2/2003 | Balson et al. |
| 2003/0050879 A1 | 3/2003 | Rosen et al. |
| 2003/0069830 A1 | 4/2003 | Morano et al. |
| 2003/0093360 A1 | 5/2003 | May |
| 2003/0125982 A1 | 7/2003 | Ginsberg et al. |
| 2003/0200167 A1 | 10/2003 | Kemp et al. |
| 2003/0220868 A1 | 11/2003 | May |
| 2003/0229571 A1 | 12/2003 | May |
| 2003/0236737 A1 | 12/2003 | Kemp et al. |
| 2003/0236738 A1 | 12/2003 | Lange et al. |
| 2004/0015430 A1 | 1/2004 | May |
| 2004/0015431 A1 | 1/2004 | May |
| 2004/0039682 A1 | 2/2004 | Sand Holm et al. |
| 2004/0049738 A1 | 3/2004 | Thompson et al. |
| 2004/0064395 A1 | 4/2004 | Mintz et al. |
| 2004/0088242 A1 | 5/2004 | Ascher et al. |
| 2004/0093300 A1 | 5/2004 | Burns |
| 2004/0103054 A1 | 5/2004 | Singer |
| 2004/0117302 A1 | 6/2004 | Weichert et al. |
| 2004/0148242 A1 | 7/2004 | Llu |
| 2004/0153391 A1 | 8/2004 | Burns et al. |
| 2004/0153392 A1 | 8/2004 | West et al. |
| 2004/0153393 A1 | 8/2004 | West et al. |
| 2004/0153394 A1 | 8/2004 | West et al. |
| 2004/0172337 A1 | 9/2004 | Spoonhower et al. |
| 2004/0186806 A1 | 9/2004 | Sinclair et al. |
| 2004/0210514 A1 | 10/2004 | Kemp et al. |
| 2004/0236662 A1 | 11/2004 | Korhammer et al. |
| 2004/0254804 A1 | 12/2004 | Peterffy et al. |
| 2005/0044027 A1 | 2/2005 | Rodgers et al. |
| 2005/0080703 A1 | 4/2005 | Chiesa et al. |
| 2005/0086152 A1 | 4/2005 | Sweeting |
| 2005/0097026 A1 | 5/2005 | Morano et al. |
| 2005/0097027 A1 | 5/2005 | Kavanaugh |
| 2005/0137964 A1 | 6/2005 | Nordlicht et al. |
| 2005/0165670 A1 | 7/2005 | Woodmansey et al. |
| 2005/0171890 A1 | 8/2005 | Daley et al. |
| 2005/0171894 A1 | 8/2005 | Traynor |
| 2005/0187866 A1 | 8/2005 | Lee |
| 2005/0203826 A1 | 9/2005 | Farrell et al. |
| 2005/0246263 A1 | 11/2005 | Ogg et al. |
| 2005/0283422 A1 | 12/2005 | Myr |
| 2006/0015436 A1 | 1/2006 | Burns et al. |
| 2006/0059064 A1 | 3/2006 | Glinberg et al. |
| 2006/0059065 A1 | 3/2006 | Glinberg |
| 2006/0059066 A1 | 3/2006 | Glinberg |
| 2006/0059067 A1 | 3/2006 | Glinberg |
| 2006/0059068 A1 | 3/2006 | Glinberg |
| 2006/0059069 A1 | 3/2006 | Glinberg |
| 2006/0095363 A1 | 5/2006 | May |
| 2006/0143099 A1 * | 6/2006 | Partlow et al. .................. 705/35 |
| 2006/0149660 A1 | 7/2006 | Morano et al. |
| 2006/0161498 A1 | 7/2006 | Morano et al. |
| 2006/0173761 A1 | 8/2006 | Costakis |
| 2006/0173771 A1 | 8/2006 | Johnston |
| 2006/0190371 A1 | 8/2006 | Almgren et al. |
| 2006/0190383 A1 | 8/2006 | May |
| 2006/0200405 A1 * | 9/2006 | Burns et al. .................... 705/37 |
| 2006/0259406 A1 | 11/2006 | Kemp et al. |
| 2006/0259409 A1 | 11/2006 | Burns et al. |
| 2006/0265296 A1 | 11/2006 | Glinberg |
| 2006/0293998 A1 * | 12/2006 | Tilly et al. ...................... 705/37 |
| 2007/0011079 A1 | 1/2007 | May |
| 2007/0100732 A1 | 5/2007 | Ibbotson et al. |
| 2007/0112665 A1 * | 5/2007 | Mackey et al. ................. 705/37 |
| 2007/0239591 A1 | 10/2007 | May |
| 2007/0282733 A1 | 12/2007 | May |
| 2008/0010187 A1 | 1/2008 | Farrell et al. |
| 2008/0077320 A1 | 3/2008 | Loftus et al. |
| 2008/0077521 A1 * | 3/2008 | Sibley et al. ................... 705/37 |
| 2008/0086405 A1 | 4/2008 | Sundaram et al. |
| 2008/0133402 A1 | 6/2008 | Kurian et al. |
| 2008/0154764 A1 | 6/2008 | Levine et al. |
| 2008/0183639 A1 | 7/2008 | DiSalvo |
| 2008/0208778 A1 | 8/2008 | Sayyar-Rodsari et al. |
| 2008/0288386 A1 | 11/2008 | Ferris |
| 2008/0288391 A1 | 11/2008 | Downs et al. |
| 2009/0018944 A1 | 1/2009 | Deverdier |
| 2009/0063365 A1 | 3/2009 | Pinkas |
| 2009/0076982 A1 | 3/2009 | Ginberg et al. |
| 2009/0083175 A1 | 3/2009 | Cushing |
| 2009/0106133 A1 | 4/2009 | Redmayne |
| 2009/0157563 A1 | 6/2009 | Serbin et al. |
| 2009/0228400 A1 * | 9/2009 | Burns et al. ................. 705/36 R |
| 2009/0327153 A1 | 12/2009 | Milne |
| 2010/0017321 A1 | 1/2010 | Callaway et al. |
| 2010/0017323 A1 * | 1/2010 | Zimmerman ................... 705/37 |
| 2010/0094746 A1 | 4/2010 | MacGregor et al. |
| 2010/0174633 A1 | 7/2010 | Milne et al. |
| 2010/0312689 A1 | 12/2010 | Bauerschmidt et al. |
| 2011/0040669 A1 | 2/2011 | Lee et al. |
| 2011/0055067 A1 | 3/2011 | Milne et al. |
| 2011/0055069 A1 | 3/2011 | Pazner |
| 2011/0066536 A1 | 3/2011 | Milne |
| 2011/0066537 A1 | 3/2011 | Milne et al. |
| 2011/0066567 A1 | 3/2011 | Acuna-Rohter et al. |
| 2011/0066568 A1 | 3/2011 | Milne et al. |
| 2011/0087579 A1 | 4/2011 | Milne et al. |
| 2011/0313905 A1 | 12/2011 | Siddall et al. |
| 2011/0320334 A1 | 12/2011 | Mintz et al. |

FOREIGN PATENT DOCUMENTS

| | | | |
|---|---|---|---|
| EP | 0 411 748 | * | 9/2005 |
| JP | 2000/353196 A | | 12/2000 |
| JP | 20011222591 A | | 8/2001 |
| WO | WO 03077061 A2 | | 9/2003 |
| WO | WO 2004/109570 | * | 12/2004 |

OTHER PUBLICATIONS

Listes et al.,: A scenario Aggregation based approach for determining a robost airline fleet composition, 2002, Research Paper, Eramus School of Economics (ESE), pp. 1-21.*

CME Group: COMEX Metal Futures on the CME Globex Platform, Jan. 19, 2007, Version 1.0, Chicago Board Trust Company, pp. 1-6.*

CME Group, Product Specific Functionality, Version 1.5, Mar. 14, 2012.

International Preliminary Report on Patentability dated Mar. 20, 2012 received in related PCT Application No. PCT/US20101047489.

Blank, John J.: "Implied Trading in Energy Futures," The Journal of Trading, vol. 2, No. 3, pp. 45-48, Summer 2007.

Bolshev, L.N.: "Least Squares, Method of," SpringerLink, Encyclopaedia of Mathematics, 2001, pp. 1-7.

Office Action in related U.S. Appl. No. 12/579,118, dated Nov. 14, 2011, 13 pages.

Office Action in related U.S. Appl. No. 12/560,026, dated Nov. 14, 2011, 14 pages.

International Search Report dated Dec. 10, 2010 received in related PCT Application No. PCT/US2010/52589.

International Search Report dated Oct. 13, 2010 received in related PCT Application No. PCT/US20101046591.

International Search Report dated Oct. 13, 2010 received in related PCT Application No. PCT/US20101047086.

International Search Report dated Oct. 25, 2010 received in related PCT Application No. PCT/US20101047489.

International Search Report dated Oct. 14, 2010 received in related PCT Application No. PCT/US20101047075.

International Preliminary Report on Patentability from related International Application No. PCT/US20101047075 mailed Mar. 20, 2012.

Augmenting agent negotiation protocols with a dynamic argumentation mechanism, by Ulrich,Thomas W., D.CS., Colorado Technical University, 2003, 253 pages; AAT 3109037.

PCT/US06/44932 International Search Report Aug. 19, 2008.
PCT/US06/43282 International Search Report May 30, 2008.
PCT/US06/44702 International Search Report Aug. 17, 2007.
PCT/US06/44917 International Search Report Aug. 28, 2007.
PCT/US06/28001 International Search Report May 7, 2007.
PCT/US06/27762 International Search Report Mar. 9, 2007.

CME® "Clearing Services CME and LCH"; Advisory Notice; http://www.web.archive.org/web/20050306002321/ http:/www.cme.com/clearing/rmsl2an/cm/lch . . . , last accessed Feb. 22, 2007; 1 page.

CME® "Clearing Services Layout for Results"; Advisory Notice; http://www.web.archive.org/web/200503081811020/ http://www.cme.com/clearinq/rmspan/cm/rec . . . , last accessed Feb. 22, 2007,2 pages.

CME® "Foreign Exchange Products; Trading CME FX Futures: Maximizing the Opportunity for the Individual Investor"; 2005; 6 pages.

CME® "Glossary for Retail FX"; http://www.cme.com/files/FXWebqlossary.pdf 16 pages.

Position Limit, http://www.investopedia.com/terms/p/positionlimitlasp• 4 pages.

U.S. Commodity Futures Trading Commission; "Security Futures Products Speculative Position Limits"; http://www.cftc.govlindustr~oversightlcontractsandl2roducts/sfl2sl2eculativelimits.html;Jul. 26, 2007; 1 page.

U.S. Commodity Futures Trading Commission; "What's New at the CFTC";http://www.cftc.qov/index.html• Mar. 19, 2009; 2 pages.

U.S. Commodity Futures Trading Commission; "Trading Organizations";http://www.cfttc.gov/industr~oversign/tradingorganizations.index.html; Mar. 19, 2009; 1 page.

U.S. Commodity Futures Trading Commission; "Clearing Organizations";http://www.cftc.gov/indust!yoversightlclearingorganizationslindex.html; Mar. 19, 2009; 2 pages.

Hall "Getting Started in Stocks"; Third Edition; Google Book Search;http://books.google.com/books?id=mA-sSKmB2sC&dg+margin+account+maintenance . . . ;Sep. 26, 2008; pp. 105-114; Coughlan Publishing; 1997.

K. Balasubramanian et ai, "Developing Applications Using Model-Driven Design Environments", IEEE Computer, Feb. 2006 (vol. 39, No. 2).

K. Chen et ai, "Towards Formalizing Domain-specific Modeling Languages", Vanderbilt University Institute for Software Integrated Systems, presented at the Object Management Group (OMG) OMG's First Annual Model-Integrated Computing Workshop, 2004.

CME Group: COMEX metal futures on the CME Globex Platform, Version: 1.0 , Release: Jan. 19, 2007, pp. 1-6.

FDA, U.S. Department of Health & Human Services: Guidance for Industry: Nutrition Labeling Manual—A guide for developing and using data bases, Mar. 17, 1998, pag'3s 1-23.

G. Guizzardi et ai, "On the role of Domain Ontologies in the design of Domain-Specific Visual Modeling Languages", Proceedings of the 1 ih ACM Conference on Object-Oriented Programming, Systems, Languages and Applications (OOPSLA 2002), Seattle, USA, 2002, Helsinki School of Economics Printing, Working Paper Series @-334 (ISSN 1235-5674),downloaded from Centre for Telematics and Information Technology, University of Twente,The Netherlands.

G. Guizzardi et ai, "Ontology-Based Evaluation and Design of Domain-Specific Visual Modeling Languages", Proceedings of the 14th International Conference on Information Systems Development, Karlstad, Sweden, 2005.

G. Karsai et ai, "Model-Integrated Development of Embedded Software", Proceedings of the IEEE, Jan. 2003, vol. 91, No. 1.

D. Schmidt, "Model-Driven Engineering", IEEE Computer Feb. 2006; vol. 39, No. 2.

Peake, The National Book System, an Electronically Assisted Auction Market, pp. 02290-pp. 02353 (Apr. 30, 1976).

INTEX, The International Futures Exchange (Bermuda) Limited, Functional Specifications,pp. 01932-pp. 01999 (Aug. 1981).

Patent Examination Report No. 1, from related Australian Application No. 2010306793, Mar. 22, 2012, AU.

* cited by examiner

LEG PRICER

RELATED APPLICATIONS

This application is a continuation under 37 C.F.R §1.53(b) of U.S. patent application Ser. No. 12/579,118 filed on Oct. 14, 2009 now U.S. Pat. No. 8,229,838, which is hereby incorporated by reference in its entirety.

This application is related to U.S. patent application Ser. No. 10/700,406, filed Nov. 4, 2003, which is incorporated herein by reference in its entirety.

This application is related to U.S. patent application Ser. No. 11/368,966, filed Mar. 6, 2006, which is a division of U.S. patent application Ser. No. 09/971,172, filed on Oct. 4, 2001, all of which are incorporated herein by reference in its entirety.

This application is related to U.S. patent application Ser. No. 12/032,379, filed Feb. 15, 2008, which is incorporated herein by reference in its entirety.

This application is related to U.S. patent application Ser. No. 12/350,788, filed Jan. 8, 2009, which is incorporated herein by reference in its entirety.

This application is related to U.S. patent application Ser. No. 12/553,351, filed Sep. 3, 2009, which is incorporated herein by reference in its entirety.

This application is related to U.S. patent application Ser. No. 12/560,026, filed on Sep. 15, 2009, which is incorporated herein by reference in its entirety.

This application is related to U.S. patent application Ser. No. 12/560,145, filed on Sep. 15, 2009, which is incorporated herein by reference in its entirety.

This application is related to U.S. patent application Ser. No. 12/560,122, filed Sep. 15, 2009, which is incorporated herein by reference in its entirety.

TECHNICAL FIELD

The following disclosure relates to software, systems and methods for electronic trading in a commodities exchange, derivatives exchange or similar business involving tradable items where orders from buyers are matched with orders from sellers.

BACKGROUND

Electronic trading systems allow entry of a bid or offer for a particular tradable item, which in futures trading is referred to as a contract. The simplest possible futures contract is the outright contract defined by a product and a delivery period. It is also possible to define contracts that are combinations of simpler contracts. For example, the spread contract is defined as the simultaneous purchase and sale of two tradable items, such as futures contracts for different months, different commodities, or different grades of the same commodity. The bid and offer components of a spread are termed the bid leg and the offer leg respectively.

Electronic trading systems accept bids and offers in the form of orders, also referred to as real orders because they consist of data entered by traders either directly or by computing devices under their control. Real orders may be entered for any tradable item in the system. Implied orders, unlike real orders, are generated by the system on the behalf of traders who have entered real orders, generally with the purpose of increasing overall market liquidity. For example, an implied spread may be derived from two real outrights. Trading systems create the "derived" or "implied" order and display the market that results from the creation of the implied order as a market that may be traded against. If a trader enters an order to trade against this implied market, then the newly entered order and the real orders that were used to derive the implied market are executed as matched trades.

Implied orders frequently have better prices than the corresponding real orders in the same contract. This can occur when two or more traders incrementally improve their order prices in hope of attracting a trade, since combining the small improvements from two or more real orders can result in a big improvement in their combination. In general, advertising implied orders at better prices will encourage traders to enter the opposing orders to trade with them.

An electronic trading system operated by an exchange or similar business entity must provide tradable items whose definitions and properties are acceptable to traders, regulators and other relevant stakeholders. One of these properties is the minimum price increment for the contract being traded, also referred to as the contract "tick". For example, the crude oil contract traded on the New York Mercantile Exchange is specified by the exchange to trade in increments of $0.01 per barrel and has a one-cent tick.

When a real order to buy an outright contract trades with a real order to sell an outright contract, the trading system reports the price of the trade at the price agreed to by the traders, which will normally be a multiple of the minimum price increment for the contract being traded, which may be referred to as an on-tick price.

When a real order to buy a combination contract trades with a real order to sell the same contract, the trading system records a trade for every leg of the combination. For example, a trade in the January-February crude oil spread is recorded as a trade in the January outright and a trade in the February outright. This makes it possible for the exchange to record the positions held by traders in each contract and the amounts they paid or received. The payment data is needed by the exchange to operate as a business, for example in setting margin requirements for traders.

Combination contracts include a minimum price fluctuation (i.e., tick size) as part of the contract specification. The minimum price fluctuation is not required to be the same as the tick size of one or more of the contract legs. However, in some embodiments, the minimum price fluctuation may be the same as the tick size of one or more of the contract legs. In the event that the minimum price fluctuation is the same as the tick size of one or more of the contract legs, the price of a trade in the combination may be converted into leg prices. One leg may be set to an anchor price according to a rule established by the exchange, for example, using the price of the last trade in the most recently traded leg. The other leg prices may be calculated using the anchor price plus or minus the prices of the components of the combination. Accordingly, the leg prices are automatically on-tick.

When the combination contract does not have the same tick as one or more of the legs, which can happen when the combination is a spread between products sold in different units such as gallons and barrels, then simple addition and subtraction does not automatically result in leg prices that are on-tick. In this case, the leg prices may be rounded to on-tick values so that they can be reported to the exchange. Accordingly, the spread contract may be referred to as a roundable spread.

Leg prices may be rounded to on-tick values for simple trades of roundable spreads against other roundable spreads or roundable spreads against a pair of outrights (i.e., a simple form of implied trade). Only one price rounding is typically required in these trades. The possible gains and losses from rounding are understood by the participating traders and generally accepted. However, a trading system with more complex implied markets may have tradable order combinations with any number of roundable spreads, for which a much wider distribution of gains and losses is theoretically possible.

Prior art trading systems do not have a systematic and predictable method of calculating on-tick leg prices for longer and more complex implieds. This has limited the use of implied orders in these systems.

DETAILED DESCRIPTION

Figure 1:
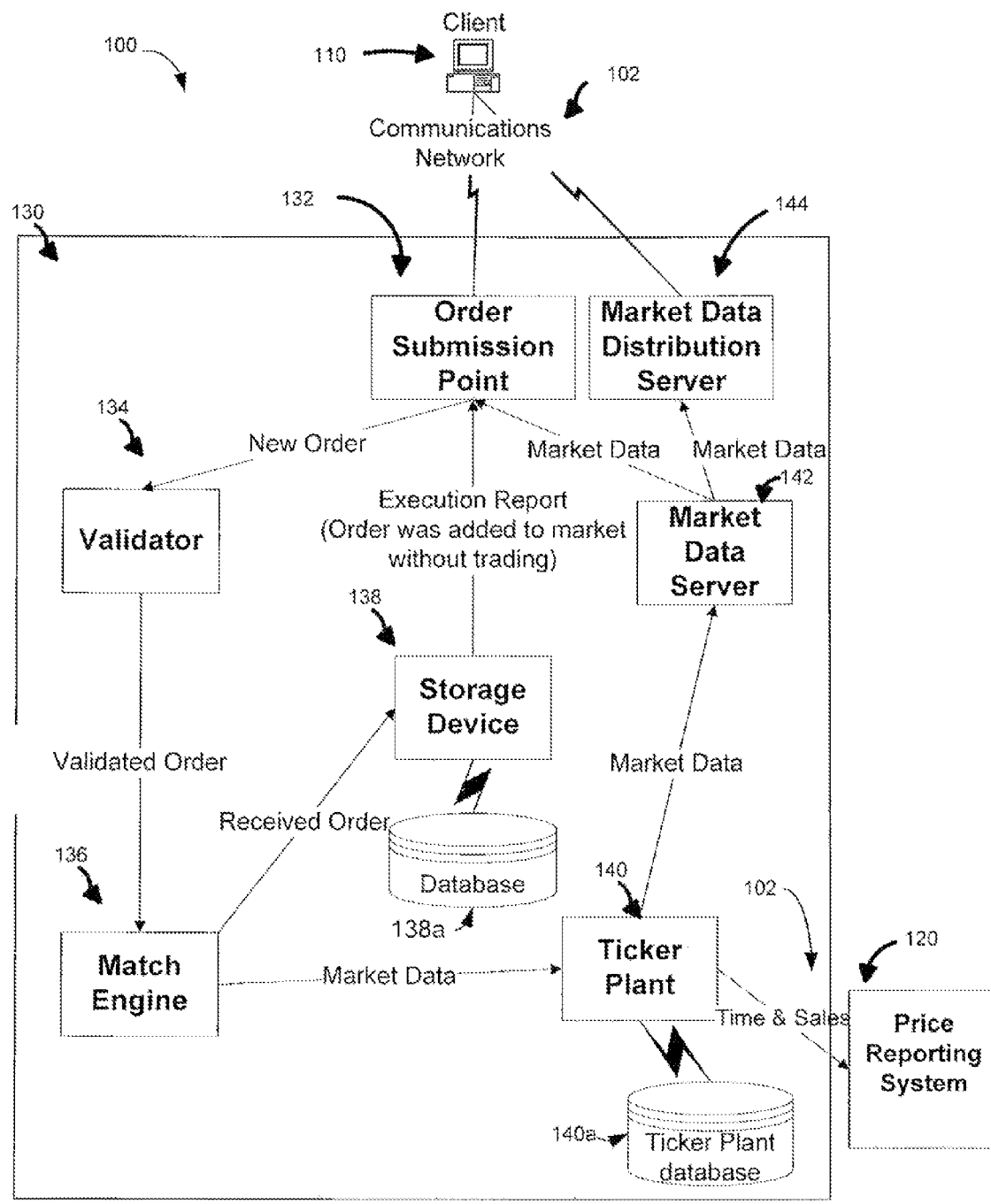
FIG. 1 illustrates an exemplary electronic trading system.

The present embodiments relate to leg pricing. As used herein, "leg pricing" includes price rounding, for example, of one or more contracts or legs, to an on-tick price. As discussed below, a tick is a minimum price fluctuation for a tradable product. An on-tick price is a price that ends with, e.g., falls on, a tick. An off-tick price is a price that does not end with, e.g., does not fall on, the tick. For example, if a tick is defined as $1.00 and the price of the contract is $3.75, then the price of the contract is off-tick. The price of the contract may be rounded to $4.00, so that the price is on-tick. This illustration is for exemplary purposes only.

Price rounding may include optimal price rounding. As used herein, the term "optimal price rounding" includes distributing the gains and losses among the orders in manner that is as fair as possible to each trader placing the orders. For example, price rounding may include the minimization or maximization of an optimality metric whose value depends on the gains and losses of traders relative to the gains and losses they would have experienced if unrounded prices had been used. The optimality metric is a systematic and predictable calculation whose general form is known to the traders.

In one aspect, a leg pricer comprises an input, a processor, and an output. The input is operable to receive a tradable combination of orders among which there are two or more roundable spreads. The processor is coupled with the input. The processor is operable to calculate leg prices for the orders in the tradable combination such that the leg prices are multiples of a minimum price increment of the leg prices and that the gains and losses of the roundable spread orders are optimally distributed. The output is coupled with the processor. The processor is operable to provide the output with the calculated prices.

In a second aspect, a leg pricer includes an input, a processor, and an output. The input is operable to receive one or more roundable spread orders, each roundable spread order having one or more roundable legs with roundable tick prices. The processor is operable to round the roundable tick prices of the roundable legs such that fractional gains and losses are minimized by distributing the fractional gains and losses. The output is operable to output the rounded tick prices as market data.

In a third aspect, a method of rounding tick prices is provided. The method includes identifying one or more roundable spread orders in an implied chain having a matching order; determining a optimal rounding scenario for rounding the leg prices of the roundable spread orders, the optimal rounding scenario ensuring that the leg prices of the roundable spread orders are on-tick and that the fractional gains and losses to traders are minimized; and rounding the leg prices of the roundable spread orders using the optimal rounding scenario.

In a fourth aspect, an apparatus for pricing legs of tradable spreads is provided. The apparatus includes a means for identifying one or more roundable spread orders in an implied chain having a matching order; a means for determining a optimal rounding scenario for rounding the leg prices of the roundable spread orders, the optimal rounding scenario ensuring that the leg prices of the roundable spread orders are on-tick and that the fractional gains and losses to traders are minimized; a means for rounding the prices of the roundable spread orders using the optimal rounding scenario.

FIG. 1 illustrates an electronic trading network 100. In this example, the electronic trading network 100 includes a client 110, a price reporting system 120, and an electronic trading system 130. The network 100 may include additional, different, or fewer components. For example, in one embodiment, the electronic trading network 100 may include only the electronic trading network. The client 110 and price reporting system 120 may be external and/or independent of the network 100. The client 110 and the price reporting system 120 may communicate with the electronic trading system 130 using a communications network 102 such as the Internet, a telephone network, or other communication network.

The client 110 may be a personal computer, server, mobile device, programmed computing device, networked computing system, or other electronic devices that may be used to transmit orders to the electronic trading system 130. The client 110 may be a user operated device. The client 110 may include a central processor that controls the overall operation of the computer and a system bus that connects the central processor to one or more conventional components, such as an electronic trading system 130. The client 110 may include a variety of interface units and drives for reading and writing data or files. Depending on the type of computer device, a trader can interact with the electronic trading system 130 using an input, such as a keyboard, pointing device, microphone, pen device or other input device. The input may be used for defining a trade.

The price reporting system 120 may be a storage device, personal computer, server, mobile device, programmed computing device, networked computing system, or other electronic devices that may be used receive data from the electronic trading system 130. The price reporting system 120 may be used to report market data, for example, to the client 110. Alternatively, the price reporting system 120 may be used to adjust, control, or manage prices of other trades.

The electronic trading system 130 may be a personal computer, server, mobile device, programmed computing device, networked computing system, or other electronic devices that may be used to match trades. The electronic trading system 130 may include an order submission point 132, validator 134, match engine 136, storage device 138, ticker plant 140, market data server 142, and market data distribution server 144. The electronic trading system 130 may include additional, different, or fewer components. Additional components may include hardware and/or software components.

The electronic trading system 130 may be used by regulated and unregulated exchanges. For example, the electronic trading system 130 may be used in or conjunction with any trading or futures market in the United States or elsewhere in the world, for example, the Chicago Board of Trade (CBOT), the Chicago Mercantile Exchange (CME), the Bolsa de Mercadorias e Futoros in Brazil (BMF), the London International Financial Futures Exchange, the New York Mercantile Exchange (NYMEX), the Kansas City Board of Trade (KCBT), MATIF (in Paris, France), the London Metal Exchange (LME), the Tokyo International Financial Futures Exchange, the Tokyo Commodity Exchange for Industry (TOCOM), the Meff Renta Variable (in Spain), the Dubai Mercantile Exchange (DME), and the Intercontinental Exchange (ICE).

The order submission point 132 may receive an electronic order (i.e., "New Order") from the client 110 via the communication network 102. The order submission point 132 may include an interface, device for receiving data, storage device, device for transmitting data, any combination thereof, or other component for receiving an electronic order from the client 110.

The order submission point 132 may communicate with the validator 134, for example, via a circuit, wire, or other communication network. For example, the order submission point 132 may transmit the New Order to the validator 134. The validator 134 may be operable to check the properties of the New Order against established criteria (i.e., "Validated Order") and communicate the Validated Order to the match engine 136. Validating the New Order may include comparing the New Order to previously entered orders. In the event that the New Order did not match any previously entered orders, the match engine 136 may receive the Validated Order and communicate the Received Order to the storage device 138, which stores the Received Order in a database 138a. The storage device 138 may be implemented as part (such as software or firmware) of the match engine 136. Alternatively, the storage device 138 may be a database, a memory or another storage element, such as computer readable storage media, tangible memory device, or other memory. Additionally, the storage device 138 may be computer hardware including a processor and a storage element. In FIG. 1, the storage of the Received Order by the storage device 138 may constitute the New Orders "official" reception by the electronic trading system 130. Accordingly, the storage device 138 may communicate an Execution Report to the order submission point 132, from which the Execution Report may be communicated to the originator of the order, i.e., the client 110. The Execution Report may confirm that the New Order was received and stored.

The routing of messages, such as a new order message, validated order message, or received order message, between the components 132 to 144 may be managed with commercially available hardware and software. It is understood that descriptions are given in the singular only to simplify the exposition. It is further understood that the term "order" and "New Order" may also refer to any data communicated to the trading system that can affect the properties of a previously communicated order, including, but not limited to, modification of its price, modification of its volume or its cancellation or replacement by a different order.

The match engine 136 may communicate the existence of a New Order or Validated Order and any implied orders that it created to the Ticker Plant 140 (reporting device) which in turn, communicates the orders to the market data server 142. Ticker Plant 140 (reporting device) may be disposed (i.e., positioned) between the match engine 136 and the market data server 132 and may aggregate data from multiple sources and communicate with components outside the electronic trading system 130, such as the price reporting system 120. Ticker Plant 140 may be implemented as an integrated component of the match engine 136. Alternatively, the ticker plant 140 may be computer software, firmware, or hardware, that is separate but in communication with the match engine 136. The market data server 132 may communicate market data to the client 110 in a variety of ways. For example, the market data may be sent to the order submission point 132 for communication with the client 110 over the same link as the New Order and/or Execution Report, or sent to a market data distribution server 144 that can communicate with zero, one, or more clients 110.

The operations of match engine 136 may be performed in more than one part of trading system 130 or in related systems. For example, the calculation of implied orders or tradable order combinations may be done by traders at their trading stations in search of arbitrage opportunities between trading networks or match engines. It is also possible to perform these calculations outside the trading system 130 for the evaluation of possible trading strategies, for instruction, regulation or in the solution of other problems where trading is used as a model.

Figure 2A:
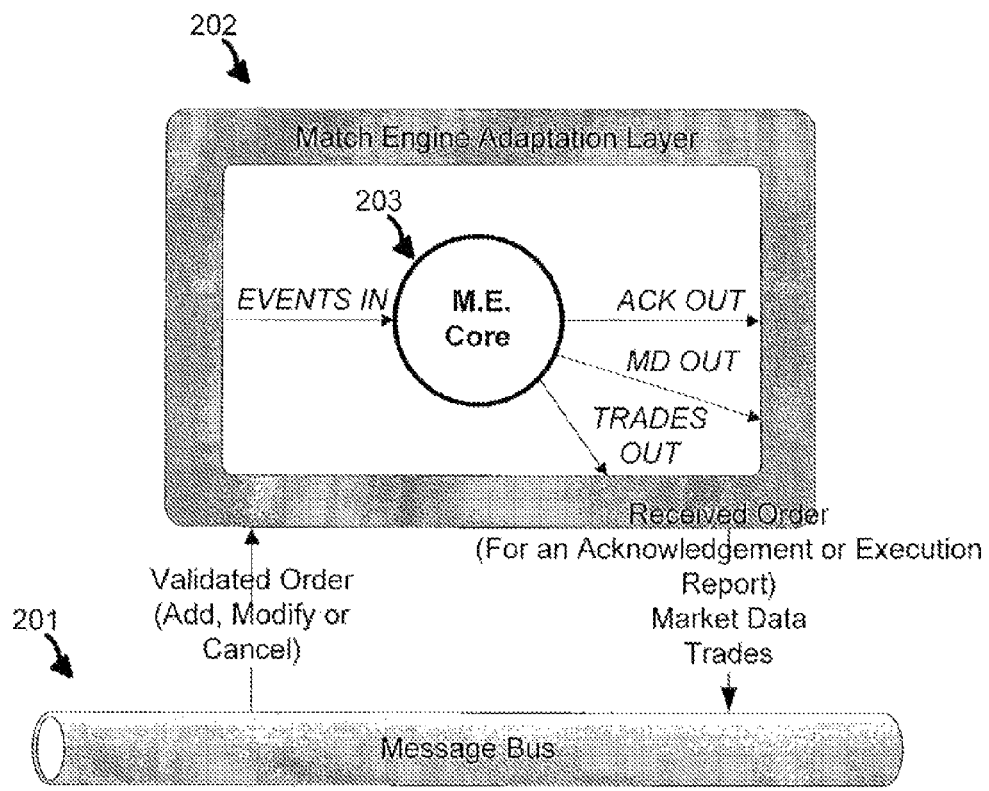
FIG. 2A illustrates an exemplary match engine architecture where the match engine is connected to other components of the trading network environment by a message bus.

FIG. 2A shows one embodiment of a match engine 136 having a layered architecture and embodied on a computer including a processor and a memory. Match engine 136 communicates with other components using a message bus 201. Incoming messages are translated by an adaptation layer 202 into events that can be processed by a match engine core 203 (hereinafter, the "core 203"). The output messages from the core 203 are translated by the adaptation layer 202 back into messages that can be transmitted to other parts of the trading system 130 using the message bus 201.

Figure 2B:
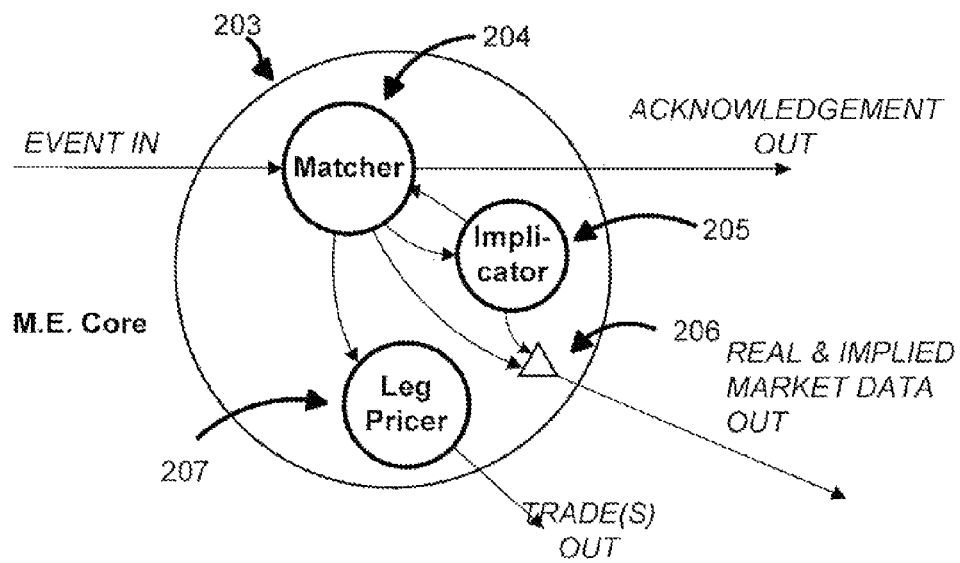
FIG. 2B illustrates an exemplary match engine core.

FIG. 2B shows the core 203 and its internal components. Incoming events from new order messages, modify order messages or cancellation messages are interpreted by the matcher 204. If the event has the potential to affect an implied market then it is passed to the implicator 205. Real and implied market data are filtered and combined by the market data aggregator 206 and passed to the adaptation layer 202 for translation into a message. The matcher 204 and the implicator 205 work together to calculate implied orders and the tradable combinations that can occur when a newly arriving order is matched with one or more resting orders. The orders involved in the tradable combinations, if any, are found and passed to the leg pricer 207. The matcher 204 decrements the working volumes of the orders that have been executed. The leg pricer 207 computes the prices that will be reported to the adaptation layer 202 for subsequent translation into external prices and data formats. In an implementation, the leg pricer 207 may compare the calculated prices with criteria previously received by the match engine 136, said criteria including but not limited to upper and lower price limits. The results of the comparison may be communicated to the matcher 204. The adaptation layer 202 sends the appropriate message or messages to other trading system components over message bus 201. Although this example includes the leg pricer 207 as part of match engine 136 in an electronic trading system 130, the leg pricer 207 may be used in any system where leg prices must be calculated, such as an accounting system used to calculate the value of trader positions or cash accounts.

Order matching may be performed by the match engine 136, of which there may be multiple instances. Order matching may include matching orders. For example, the match engine 136 may match a real order with another real order. In another example, the match engine 136 may match one or more real orders with an implied order. The match engine 136 may be a matching component that receives orders, stores them internally, calculates tradable combinations and advertises the availability of real and implied orders in the form of market data. Traders, in turn, utilize the trading system 130 to respond to the market data by sending additional orders. These additional orders are received by the match engine 136, which then attempts to match them with previously received orders or combinations thereof. The match engine 136 may execute the possible trades and communicate the results.

The embodiments are illustrated and described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved are readily extended to other protocols and interfaces in a predictable fashion.

In one embodiment, the leg pricer 207 is included in the match engine 136. However, in other embodiments, the leg pricer 207 may perform the leg pricing function in other locations and that the principles involved are readily extended to such systems.

The core 203 and its components may be implemented in a programming language such as Java or C++ that allows multiple threads of execution and that a program with multiple threads may be executed on a computing system with multiple central processing units (CPU). In such an implementation, if the program is correctly designed, the threads will execute in parallel and the time taken to execute all of the threads can be as short as the time taken by the single longest thread. If there are more threads than CPUs, then the execution time will depend on how many threads must be executed sequentially on each CPU. In FIG. 2A and FIG. 2B, it is contemplated that the core 203 will be implemented in such a language and that the calculation of implied orders by the implicator 205 will be accelerated by performing many independent calculations in parallel on separate threads. It is also contemplated that the leg pricer 207 may execute in parallel with the matcher 204 and implicator 205.

The tradable combinations received by the leg pricer 207 may include orders for both outright contracts and combination contracts. Such contracts may involve a wide range of physical products, including but not limited to crude oil, heating oil, unleaded gasoline, reformulated blendstock for oxygen blending (RBOB) gasoline, natural gas, gold, silver, copper, coffee, sugar, cocoa, cotton, orange juice and other commodities. It is well-known that physical products have different units of measurement such as barrels, gallons, ounces or pounds and that physical products also have different practices for measurement and delivery, all of which may lead to differences in how such products are priced and traded. It is understood that financial products and other tradable items including but not limited to stocks, options, indexes or emission credits also have properties that affect how they may be priced and traded. As previously mentioned, the leg pricer will be described in terms of contracts and commodity trading on the understanding that its operation may be readily extended to any tradable item.

An example of a technique for defining contracts and calculating the combinations of orders that can trade in such contracts can be found in U.S. patent application Ser. No. 12/032,379, which is incorporated herein by reference in its entirety. In general, a contract may be either implicable or non-implicable, where implicable relates to an order for that contract that can trade in combinations with orders for other contracts and non-implicable relates to only buy and sell orders in the contract can trade with each other. An implicable contract may be either an outright contract or a combination contract defined as the purchase and sale of specified quantities of any number of outright contracts. The 1:1 spread contract, hereinafter the spread, is a specific type of combination contract defined as the simultaneous purchase of a first outright contract and sale of a second outright contract, where the outright contracts may be futures contracts for different months, different commodities, or different grades of the same commodity. The purchase and sale components of a spread are termed the bid or buy leg and the offer or sell leg, respectively. In order to calculate tradable combinations, outrights may be expressed as spreads and combination contracts defined in terms of outrights may also be expressed as spreads, collections of spreads, or collections of collections of spreads. As a result, price calculations defined for tradable combinations of spreads can be readily extended to tradable combinations of other contracts. It is understood that a leg pricer 207 that can calculate prices for tradable combinations of outright and spread orders in implicable contracts will also be operable for the simple buy-sell combinations found in non-implicable contracts.

Figure 3:
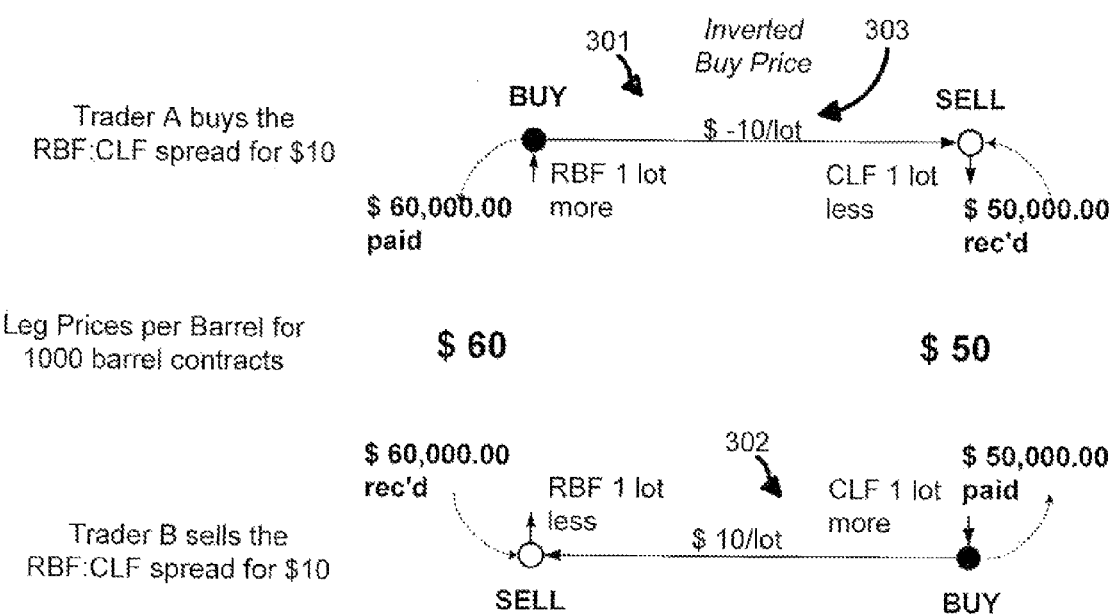
FIG. 3 illustrates one embodiment of a trade.

FIG. 3 illustrates a spread trade between two hypothetical traders. The RB:CL spread is defined as the purchase of one lot of reformulated blendstock for oxygen blending (RBOB) gasoline (symbol RB) and the sale of one lot of West Texas Intermediate Crude Oil (symbol CL). Buying the spread may include buying the distillate and selling the crude. Accordingly, the RB:CL spread may be positively priced. The RB:CL spread is shown for the calendar month of January (letter code F) with the year left unspecified in order to lighten the illustration. Trader A has entered an order 301 to buy the RBF:CLF spread for $10.00. Trader B has entered an order 302 to sell the RBF:CLF spread for $10.00. The convention implemented in the adaptation layer 202 of match engine 136 is that buy orders have their prices inverted, so that the tradability of a combination of orders can be determined by adding the prices of the orders and comparing the sum to zero.

A tradable combination has a price sum of zero or less (i.e., zero or a negative number). The inverted price 303 is shown as a decoration on the order 301.

In order to distinguish between ordinary external prices and the inverted buy prices used by the core 203, the terms "external price" and "machine price" may be used. The suffixes "e" (i.e., for external prices) and "m" (i.e., for machine price) may be used in numerical examples. For example, a buy order for unleaded gasoline may have a price of $2.0000/gallon and be shown as "2e." If the price were scaled to $84.0000/barrel (1 barrel=42 gallons) for use in calculating the price of a tradable combination, this might be shown as "84e". If a buy and sell order at this price were shown in a tradable combination, the prices might appear as "−84 m" and "84 m". One benefit of this convention is that "lower is better" in the sense that −85m is a better bid than −84m, i.e. the bidder is proposing a better price to the seller when he or she raises the bid from 84e to 85e.

In one embodiment, the trade between Trader A and Trader B is recorded by the trading system not just as a trade between the spread orders but also as a trade in each of the legs. The working volumes of the spread orders are reduced by the amount traded and the traders are informed that the orders have been executed. The trades in the legs are used to account for the changes in the traders' cash balances and positions held in each contract. The prices in the legs may have been determined to be $60.00 for RBF and $50.00 for CLF. Accordingly, Trader A pays Trader B $60,000.00 for an RBF contract and Trader B pays Trader A $50,000.00 for a CLF contract. For a simple buy-sell combination this nets out to $10,000.00 between Traders A and B's cash accounts but for more complex tradable combinations there can be multiple payments and receipts, sometimes with the same trader having more than one order present. Note that inverting the buy prices makes it possible to calculate the change in a trader's cash position from the product of the order price and order quantity. When the orders in a tradable combination are executed together in the same transaction, the sum of the changes in cash positions is zero and the sum of changes in position is also zero.

Figure 4:
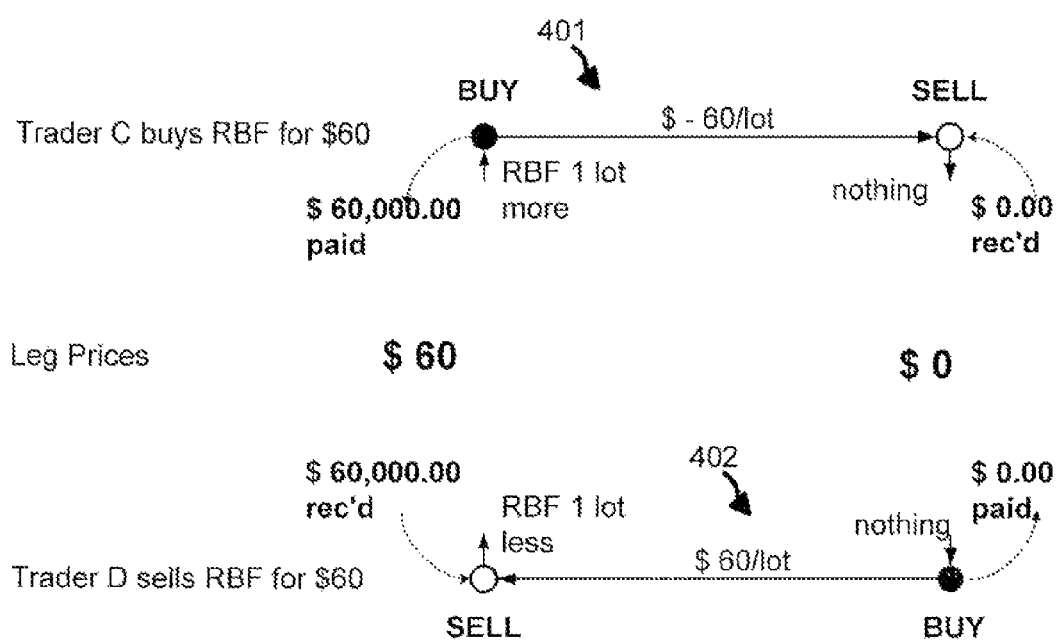
FIG. 4 illustrates one embodiment of an order for an outright contract as an order for a spread contract.

FIG. 4 shows a representation of an order for an outright contract as an order for a spread contract. A buy outright 401 is shown trading with a sell outright 402. The spread contract may be defined as "buying the outright and selling nothing," where "nothing" may include a virtual outright used to generalize and simplify the rules for bookkeeping. The first of these bookkeeping rules is that "nothing costs nothing," so the leg price at the "nothing" end of the spread is always zero. The second bookkeeping rule is that the raw leg price at the sell end of a spread order, prior to any rounding, may be calculated by adding the leg price at the buy end and the price of the order. Fixing the price of the virtual outright at zero and using inverted buy prices allows the leg price of $60 at the RBF end to be calculated either by adding $60.00 to $0.00 (across the buy nothing, sell RBF order) or by subtracting $−60.00 from $0.00 (across the buy RBF, sell nothing order). The leg trades where nothing is bought or sold and nothing is paid or received are not included in the messages published by the match engine 136 or retained beyond their usefulness as an aid to calculation.

Figure 5A:
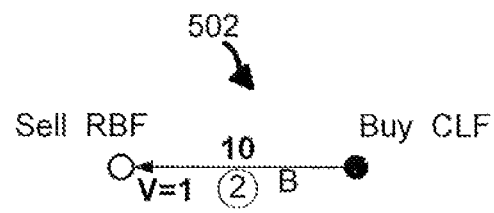
FIG. 5A and FIG. 5B illustrates one embodiment of a buy-sell tradable combination.
Figure 5A:
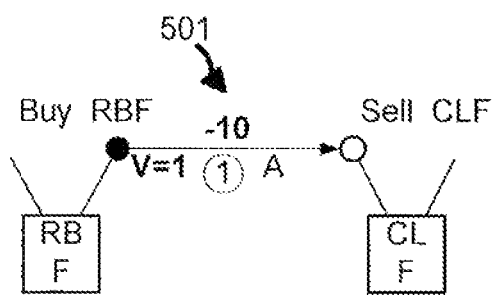
Figure 5B:
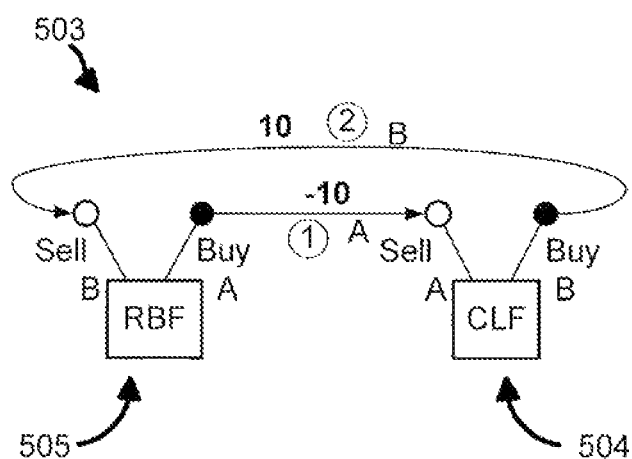

FIG. 5A and FIG. 5B show a representation of a buy-sell tradable combination. In FIG. 5A, the buy RBF:CLF spread order 501 from Trader A is resting in the core 203 and the sell RBF:CLF order 502 from Trader B is arriving as a new order. The circled numbers 1 and 2 indicate the sequence numbers or arrival times of the orders, indicating that the order 501 arrived in the core 203 before order 502. The decoration "V=1" on both orders indicates that both are for one lot. In FIG. 5B, the matcher 204 has formed a tradable combination that can be passed to the leg pricer 207. The orders are connected "head-to-tail" to form a circuit or cycle 503 such that the buy end of the arriving order is attached to the sell end of the resting order at the CLF leg 504 and the sell end of the arriving order is attached to the buy end of the resting order at the RBF leg 505. The sum of the prices in the orders around the circuit is zero. The prices for the leg trades have been left undetermined.

Figure 6:
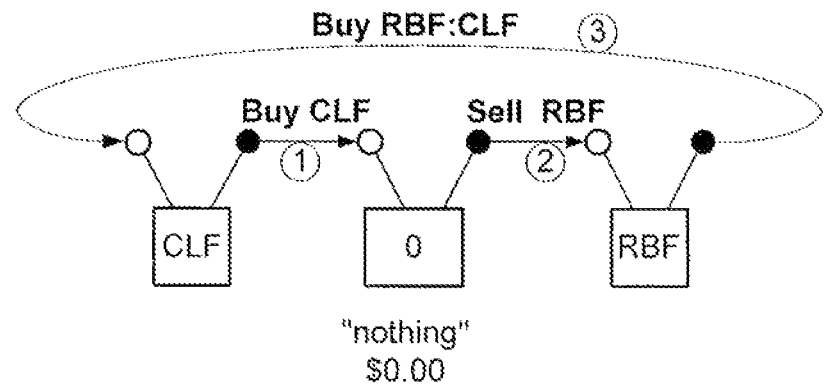
FIG. 6 illustrates one embodiment of a tradable combination including two outrights and a spread expressed in the same circuit representation as used in FIG. 5B.

FIG. 6 shows a tradable combination including two outrights and a spread expressed in the same circuit representation as used in FIG. 5B. FIG. 6 illustrates the "nothing" outright relative to CLF and RBF. The leg price of the "nothing" outright is zero. Accordingly, as discussed above, using inverted buy prices allows the leg price at the RBF end to be calculated by adding the selling price for RBF across the buy nothing, sell RBF order. The leg price at the CLF end is similarly calculated by either adding the price of the RBF:CLF order (as rounded for trading) to the leg price of RBF, or by subtracting the (inverted) price of the Buy CLF order. The leg trades where nothing is bought or sold and nothing is paid or received are not included in the messages published by the match engine 136 or retained beyond their usefulness as an aid to calculation.

Figure 7:
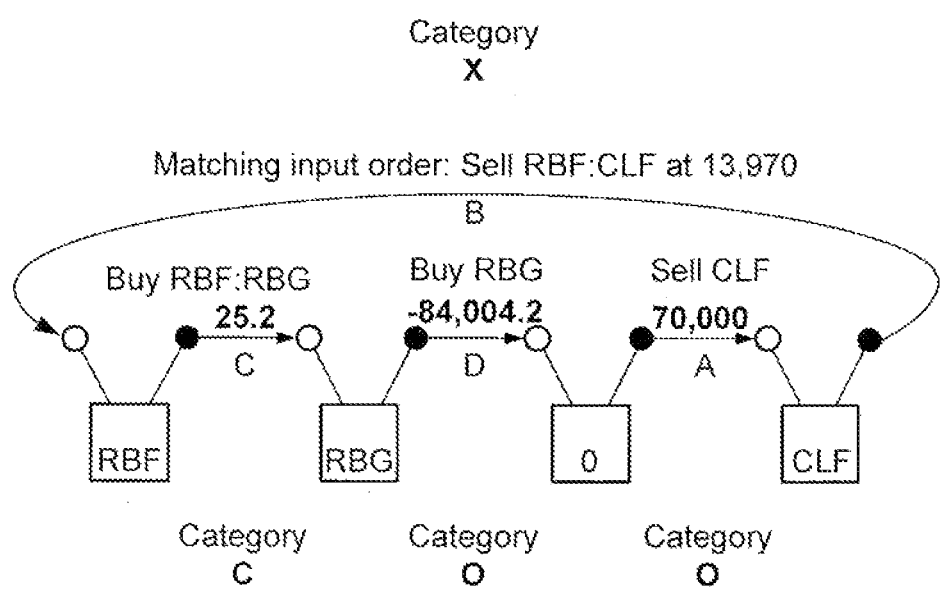
FIG. 7 illustrates one embodiment of a tradable combination including two outrights, a calendar spread and an intercommodity spread.

FIG. 7 shows a tradable combination including an RBF:RBG calendar spread (January to February), an RBG outright, a CLF outright and an RBF:CLF inter-commodity spread. The prices in FIG. 7 are given in dollars per full contract. Accordingly, the prices are expressed in the same unit so that they can be added and subtracted to determine leg prices. For example, the leg price for the CLF leg would be $70,000.00 for the full contract or $70.00/barrel applied to full contract of 1000 barrels.

The orders in a tradable combination may be categorized according to their contracts. In one embodiment, these contract-related categories are represented by the letter symbols shown in Table 1. For example, the letter symbol "O" may represent an outright, "C" may represent a non-roundable spread (e.g. a calendar spread) and "X" may represent a roundable spread (e.g. a crack spread such as RB:CL). The letter "I" indicate an implication or trading pattern and is used to locate the trigger order. For example, in FIG. 7, the contract categories of the orders in the tradable combination are shown as "C", a first "O" and a second "O" for the resting orders and an "X" for the incoming Sell RBF:CLF that trades with the Buy RBF:CLF implied by the resting orders. This relationship is expressed by the string "COOIX" which may be read as "a calendar spread and two outrights imply (and subsequently trade with) a crack spread". Strings formed from the symbols of Table 1 that correspond to tradable combinations are referred to as implication patterns (hereinafter "patterns").

TABLE 1

| Combination Categories of Orders in Contracts | | |
|---|---|---|
| Symb | Nicknam | Contract Type |
| O | outright | Outright contract, e.g. January 2010 crude oil CLFO |
| C | calendar or "spread" | Any spread contract where the legs are in the same unit and have the same tick size as the spread itself. The NYMEX crude oil calendar spread, e.g. CLFO:CLGO is an example of this type, but so are intra-commodity spreads where the units and ticks are the same, such as RB:HO, the spread between gasoline and heating oil. |

TABLE 1-continued

Combination Categories of Orders in Contracts

| Symb | Nicknam | Contract Type |
|------|---------|---------------|
| X | Crack or "roundable spread" | Any spread contract where the tick size in the contract is different than the tick size in one of the legs. The crack spread, e.g. RBFO:CLFO is an example of this type, but so is the NYMEX silver (SI) spread whose tick size is smaller than the tick size of the silver outright. |
| I or i | "implies" or "trades with" | Not a contract itself, but appears in expressions along with the contract type to indicate an implication or trading pattern, e.g. "oole" to represent two outrights implying or trading with a calendar spread. In the latter case, the order in the final position is the trigger order. |

Every contract in the trading system has a tick size. As used herein, a "tick" is a minimum price fluctuation for a tradable product and the tick size, i.e., the size of the fluctuation, is defined by the exchange that offers the contract as a tradable item. Different tradable products have different sized ticks. For example, the common tick size for crude oil is 1 cent ($0.01) per barrel and the common tick size for gasoline is $1/100$ of a cent ($0.0001) per gallon. It is understood that every computer implemented trading system must impose some finite limit on the precision of the prices used in trading and that even contracts with very small tick sizes require leg pricing.

In addition to the tick size there is a price per tick determined by the size of the contract being traded. For example, the common contract size for crude oil and its distillates is 1000 barrels or its equivalent 42000 gallons. A contract for 1000 barrels that varies in price increments of $0.01 per barrel will vary in total value increments of $10.00. This is referred to as the price per tick and reflects the gain or loss to a trader who buys a contract and sells it at the closest possible price. It is understood that an exchange may define the tick sizes for its contracts so that traders buying at a given price and selling at a price one tick higher will receive a gross profit from which their costs can be reasonably met, notable among which are the transaction fees charged by the exchange.

Table 2 illustrates various tick sizes and prices per tick for various outright contracts defined by the NYMEX. Table 3 illustrates various tick sizes and prices per tick for various intra-commodity spreads defined by the NYMEX, including but not limited to calendar spreads within some of the commodities of Table 2. Table 4 illustrates various tick sizes and prices per tick for various inter-commodity spreads defined by NYMEX between some of the commodities of Table 2. Other tradable products, tick sizes, and prices per tick may be defined by the same or different exchanges. For example, another exchange may have a different tick size for CL. It should be noted that the RB (reformulated blendstock for oxygen blending gasoline) contract has since replaced the HU (NY Harbor unleaded gasoline) contract as the benchmark for gasoline and that HU is no longer traded at NYMEX. However, the procedure for leg pricing is identical for both contracts and both are used in the figures herein.

TABLE 2

Tick Size and Price for Outright Contracts

| Outright Contract | Tick Size | Price per Tick ($) |
|---|---|---|
| CL | 0.01 | 10.00 |
| SC | 0.01 | 10.00 |
| HO | 0.0001 | 4.20 |
| HU | 0.0001 | 4.20 |
| RB | 0.0001 | 4.20 |
| GR | 0.25 | 25.00 |
| NG | 0.001 | 10.00 |
| PN | 0.0001 | 4.20 |
| PL | 0.10 | 5.00 |
| PA | 0.05 | 5.00 |
| QL | 0.01 | 15.50 |
| GC | 0.10 | 10.00 |
| SI | 0.005 | 25.00 |
| HG | 0.0005 | 12.50 |
| AL | 0.0005 | 22.00 |
| JM | 0.05 | 42.00 |
| RS | 0.25 | 25.00 |
| RN | 25.00 | 250.00 |

TABLE 3

Tick Size and Price for Calendar Spread

| Intra-Commodity | Minimum Tick | Price per Tick ($) |
|---|---|---|
| CL | 0.01 | 10.00 |
| HO | 0.0001 | 4.20 |
| HU | 0.0001 | 4.20 |
| RB | 0.0001 | 4.20 |
| NG | 0.001 | 10.00 |
| PN | 0.0001 | 4.20 |
| PL | 0.10 | 5.00 |
| PA | 0.05 | 5.00 |
| QL | 0.01 | 15.50 |
| GC | 0.10 | 10.00 |
| 81 | 0.001 | 5.00 |
| HG | 0.0005 | 12.50 |
| AL | 0.0005 | 22.00 |
| JM | 0.05 | 42.00 |

TABLE 4

Tick Size and Price for Inter-Commodity Spread Contracts

| Inter-Commodity | Minimum Tick | Price per Tick ($) |
|---|---|---|
| HO:CL | 0.01 | 10.00 |
| HU:CL | 0.01 | 10.00 |
| HU:HO | 0.0001 | 4.20 |
| RB:CL | 0.01 | 10.00 |
| RB:HO | 0.0001 | 4.20 |

The tradable combinations received by the leg pricer 207 may be grouped into pattern categories, which are summarized in Table 5. The pattern categories may clarify the description of the leg pricing calculations. A variety of categorizations are possible and that a computer implementation of the leg pricer 207 may arrive at the required calculations through other means. In particular, pattern category six may include all combinations not assigned to other categories and in one embodiment may be the only category present since pattern category six is applicable to all tradable combinations.

TABLE 5

Pattern Categories of Tradable Combinations

| Pattern Category | Pattern Examples | Description |
|---|---|---|
| 1 | OIO | Real outright with real outright. |
| 2 | CIC, CCIC, CCCIC, etc. | Real spread with real spread or any number of real spreads where the ticks on all spreads and in all the legs of all the spreads are the same. |
| 3 | OOIC, OOCIC, OOCCIC, etc. | Two outrights and any number of spreads with the same unit and tick size both in the spreads and in their legs. The leg pricing for COIO and OCIO follows the same procedure as the leg pricing for OOIC, as do the cyclic permutations of all other patterns. |
| 4 | XIX | Real roundable spread with a real roundable spread. This is a special case that allows no-loss leg pricing in certain cases. |
| 5 | OOIX, OOCIX, OOCCIX, etc. | Any combination with outrights and a single roundable spread. Any number of calendar spreads or other non-roundable spreads may be present. |
| 6 | OOXIX, OOCXIX, OOCXCXIX, CXCIX, CXXCXIC, etc. | Any combination. All of the preceding categories 1-5 are special cases that may, but do not have to be, processed separately by the Leg Pricer. |

An exemplary roundable spread contract is a spread between products with different tick sizes, where the spread can be priced in only one of the ticks. Exemplary products are NYMEX heating oil (HO) and light, sweet crude oil (CL). Heating oil (HO) is priced in gallons with a tick size of $4.20 per contract. Light, sweet crude oil (CL) is priced in barrels with a tick size of $10 per contract. The HO:CL spread is priced in barrels with a tick size of $10 per contract.

Alternatively, a roundable spread contracts may be a spread within a commodity where the spread tick is smaller than the underlying outright tick. One example of a spread within a commodity, where the spread tick is smaller than the underlying outright tick, is a silver (SI) outright having a tick size of $25/contract but the SI:SI calendar spread having a tick size of $5/contract. The tick size for the SI:SI calendar spread is smaller than the tick size for the silver outright.

In yet another alternative embodiment, a roundable spread contract may be a spread having a tick size that is different from the tick sizes of two or more tick sizes in the underlying outright, where the tick sizes of the underlying contract are different from each other.

The trading system 130 may include match engines 136. Each match engine 136 may perform matches for a orders in a group of contracts. Contracts may be assigned to groups for a variety of reasons, including but not limited to increasing the speed of order execution through parallel processing, reducing the risk of failure through redundant processing or implementing business agreements where one exchange provides trading services for another. Contracts may be grouped so that the outright contracts in a single product and the calendar spreads between them are assigned to an independent match engine 136. For example, in one embodiment, the NYMEX natural gas (NG) outrights and calendar spreads trade on an independent match engine 136 within the trading system 130 and the leg pricer 207 inside core 203 receives only tradable combinations whose orders all have the same tick size and for which leg prices may be readily calculated. When the scope of implication in a group of contracts traded in a match engine 136 is limited to simple patterns that contain at most one roundable spread, then simple rounding or averaging techniques will be adequate to calculate acceptable leg prices. A leg pricer 207 may calculate leg prices in an equitable and predictable manner for trading combinations of arbitrary complexity must be operable to process the simplest combinations as well as the most complex. Those of skill in the art will appreciate the advantage of having a single computer program for leg pricing that can be used in every match engine 136 within trading system 130.

The leg pricer 207 may receive a tradable combination that belongs to any category. One of the orders in the combination may be a trigger order which is either market order or a limit order whose limit price is better than the price needed to trade with the one or more other orders in the combination. If so, the price of the trigger order for the purpose of calculating trade prices and leg prices set to a price that is just capable of trading. For example, a buy order with limit price of $70.05 may be entered with the intent of trading with a resting sell order at $70.03. For the purpose of calculating leg prices, the buy order is treated as if the price were $70.03. In the case of implied orders that contain roundable spreads, it is understood that the price of the implied order published in the market data will be such that any input order entered at an equal or better price will be capable of forming a tradable combination with the orders in the implied. For example, if an implied sell order was calculated to have a price of $70.0126 and the tick size in the relevant contract was $0.01, the published price would be rounded "away from the market" to the on-tick selling price of $70.02. In other words, sell prices are rounded up to the next tick and buy prices are rounded down before publishing. A buy order entered at a price of $70.02 is capable of trading with an implied order to sell at $70.0126, whereas a buy order entered at the next-lowest on-tick price of $70.01 would not be capable of trading with an implied order to sell at $70.0126. It is understood that the procedure of assigning a trade price based on the prices of the resting orders represents a common business practice and not a limitation of the leg pricer 207. For example, a group of elected stop orders with equal time priority could have trade prices set according to a weighted average or other rule, so long as the trade price for every order in the tradable combination may be determined.

The leg pricer 207 may receive a tradable combination that belongs to any pattern category, as shown in Table 5. The prices of outright trades and the prices of leg trades in the spread contracts may be calculated. The prices of these leg trades may be recorded, along with a timestamp or sequence number such that the question "which is the most recent leg trade and what was its price" may always be given a unique answer. The leg pricer 207 may be initialized with data for all possible outright trades, so that the question may be given a unique answer before any actual trades have been recorded. For example, the initial prices can be taken from the previous session's settlement prices and the initial times from the times that the contracts were created in the trading system. The recording of the trades in the outright contracts and in the legs of spreads in a tradable combination may be conditional on the property of price discovery, which the exchange may assign to categories of tradable combinations. In an implementation, the presence of outright contracts in a tradable combination causes that combination to have the property of price discovery. Those of skill in the art will appreciate that other assignments and initializations are possible and that the leg pricer 207 may be readily extended to accommodate these.

a. Leg Pricing: Category One

The leg pricer 207 may receive a tradable combination belonging to pattern category one, wherein an outright trades with an outright. The trade price is the price of the order that was entered first and therefore has the highest time priority. The only leg to price is the trade. No rounding decision is required. FIG. 4 is an example of a category one trade. In an implementation, combinations belonging to category one are considered to have price discovery. The leg pricer 207 records the time of the trade and the trade price, since these may be used to determine the anchor leg and the anchor price when calculating leg prices for combinations that belong to other categories. The leg pricer 207 may determine the price of each leg and report the prices to the ticker plant 140.

b. Leg Pricing: Category Two

The leg pricer 207 may receive a tradable combination belonging to pattern category two, where any number of real spreads may be present so long as the tick sizes on the all spreads and all of the legs of the spreads are the same. The leg pricer 207 determines which leg has the most recent trade and what the price of that trade was. This leg is designated as the anchor leg and the most recent trade price in that leg is designated as the anchor price. The prices of the other legs are determined by adding or subtracting the prices of the orders that are connected in the tradable combination according to the procedures already described. In an implementation, combinations belonging to category two are not considered to have price discovery. The leg pricer 207 does not record the times of the leg trades or the prices. FIG. 3 is an example of a category two trade. If the most recent leg trade had been the $60m trade in RBF, then this would be the anchor price and the other leg price of $50m determined by adding the $−10m order price across the order leading from the anchor. The leg pricer 207 may determine the price of each leg and report the prices to the ticker plant 140.

c. Leg Pricing: Category Three

Leg pricer 207 may receive a tradable combination belonging to pattern category three, wherein two outrights and any number of real spreads may be present so long as the tick sizes on the all spreads and all of the legs of the spreads are the same. The anchor leg is set to the virtual outright at the junction point between the two outright contracts and the anchor price is set to zero. The prices of the other legs are determined by adding or subtracting the prices of the orders that are connected in the tradable combination according to the procedures already described. In one embodiment, combinations belonging to category three are considered to have price discovery. Leg pricer 207 records the times and prices of the leg trades as previously described. Leg pricer 207 may determine the price of each leg and report the prices to the ticker plant 140.

d. Leg Pricing: Category Four

Leg pricer 207 may receive a tradable combination belonging to pattern category four, where a real roundable spread order trades with an opposing real roundable spread order in the same roundable spread contract. The leg pricer 207 is operable to perform zero-loss leg pricing and round-to-nearest-tick leg pricing. In one embodiment, the choice of method is established by the exchange and communicated to the match engine 136, for example as a contract property read from database 138a when the match engine starts up. In one embodiment, combinations belonging to pattern category four are not considered to have price discovery. Leg pricer 207 may not record the times of the leg trades or the prices.

Leg pricer 207 may perform zero-loss leg pricing for spreads where the spread tick is the same as one of its leg ticks and the two leg ticks have reasonably small common multiple, with the criterion of reasonably small is a numerical value set by the exchange. For example, the HO:CL spread contract and the HU:CL spread contract traded on the New York Mercantile Exchange are priced in barrels with a tick size of $0.01 and a price per tick of $10.00 on the 1000 barrel contact. The HU or HO legs are priced in gallons with a tick size of $0.0001. There are 42 gallons to the barrel and the contract size is 42000 gallons in order to make it comparable in size to the crude oil contract. The price per tick is $4.20. The CL leg is priced in barrels with a tick of $0.01, same as the spread. The $10.00 increment and the $4.20 increment have a common multiple at $210.00. Expressed in terms of contract prices, every CL contract priced at a multiple of $0.21 has its counterpart of an HO or HU contract priced at a multiple of $0.0050. For the NYMEX trading community this is a "reasonably small common multiple" and zero-loss leg pricing can be applied to HU:CL and HO:CL.

In zero-loss leg pricing, the leg with the same tick as the spread is referred to as the spread tick leg and the other leg is referred to as the common multiple leg. The leg price in the common multiple leg is set to a multiple of the tick and the spread price is used to calculate the leg price in the spread tick leg. This puts the leg prices and the spread price on-tick.

An example of zero-loss leg pricing is shown in Table 6. The example shows the more complex situation where the anchor leg, determined by the most recent trade or similar criteria, is in the spread tick leg CL at a price of $70.00. If the anchor price was in the common multiple leg, it could be used immediately as the raw price. If not, as shown in the example, a raw price for the common multiple leg (HO) is computed by adding or subtracting the trade price from the price of the anchor leg. In this case the price is added because HO is defined as the front leg of the spread, i.e. "buy HO:CL means buy HO, sell CL" so that a positive trade price for HO:CL corresponds to HO being higher in price than CL. The common multiple anchor price is then computed by rounding the raw price to a common multiple of the two ticks, e.g. $210 per contract for HO:CL. The leg price in the spread tick leg is computed by adding or subtracting the trade price as appropriate. The external prices in dollars per gallon or dollars per barrel are calculated by applying the appropriate scale factors.

TABLE 6

Example of Zero-Loss Leg Pricing

| HO:CL trade price $/bbl | HO:CL Price scaled by 1300 | CL anchor price scaled by 1300 | HO raw price for common multiple HO leg | HO common multiple anchor price (HO zero loss internal | CL zero-loss leg price internal (subtract internal spread price from | CL zero-loss leg price external $/bbl | HO zero-loss leg price external $/gal | Difference between zero-loss CL leg price and original CL anchor $/bbl |
|---|---|---|---|---|---|---|---|---|
| 14.00 | 14000 | 70000 | 84000 | 84000 | 70000 | 70.00 | 2.0000 | 0.00 |
| 14.01 | 14010 | 70000 | 84010 | 84000 | 69990 | 69.99 | 2.0000 | −0.01 |

TABLE 6-continued

Example of Zero-Loss Leg Pricing

| HO:CL trade price $/bbl | HO:CL Price scaled by 1300 | CL anchor price scaled by 1300 | HO raw price for common multiple HO leg | HO common multiple anchor price | CL zero-loss leg price internal (subtract internal spread price from | CL zero-loss leg price external $/bbl | HO zero-loss leg price external $/gal | Difference between zero-loss CL leg price and original CL anchor $/bbl |
|---|---|---|---|---|---|---|---|---|
| 14.02 | 14020 | 70000 | 84020 | 84000 | 69980 | 69.98 | 2.0000 | −0.02 |
| 14.03 | 14030 | 70000 | 84030 | 84000 | 69970 | 69.97 | 2.0000 | −0.03 |
| 14.04 | 14040 | 70000 | 84040 | 84000 | 69960 | 69.96 | 2.0000 | −0.04 |
| 14.05 | 14050 | 70000 | 84050 | 84000 | 69950 | 69.95 | 2.0000 | −0.05 |
| 14.06 | 14060 | 70000 | 84060 | 84000 | 69940 | 69.94 | 2.0000 | −0.06 |
| 14.07 | 14070 | 70000 | 84070 | 84000 | 69930 | 69.93 | 2.0000 | −0.07 |
| 14.08 | 14080 | 70000 | 84080 | 84000 | 69920 | 69.92 | 2.0000 | −0.08 |
| 14.09 | 14090 | 70000 | 84090 | 84000 | 69910 | 69.91 | 2.0000 | −0.09 |
| 14.10 | 14100 | 70000 | 84100 | 84000 | 69900 | 69.90 | 2.0000 | −0.10 |
| 14.11 | 14110 | 70000 | 84110 | 84210 | 70100 | 70.10 | 2.0050 | 0.10 |
| 14.12 | 14120 | 70000 | 84120 | 84210 | 70090 | 70.09 | 2.0050 | 0.09 |
| 14.13 | 14130 | 70000 | 84130 | 84210 | 70080 | 70.08 | 2.0050 | 0.08 |
| 14.14 | 14140 | 70000 | 84140 | 84210 | 70070 | 70.07 | 2.0050 | 0.07 |
| 14.15 | 14150 | 70000 | 84150 | 84210 | 70060 | 70.06 | 2.0050 | 0.06 |
| 14.16 | 14160 | 70000 | 84160 | 84210 | 70050 | 70.05 | 2.0050 | 0.05 |
| 14.17 | 14170 | 70000 | 84170 | 84210 | 70040 | 70.04 | 2.0050 | 0.04 |
| 14.18 | 14180 | 70000 | 84180 | 84210 | 70030 | 70.03 | 2.0050 | 0.03 |
| 14.19 | 14190 | 70000 | 84190 | 84210 | 70020 | 70.02 | 2.0050 | 0.02 |
| 14.20 | 14200 | 70000 | 84200 | 84210 | 70010 | 70.01 | 2.0050 | 0.01 |
| 14.21 | 14210 | 70000 | 84210 | 84210 | 70000 | 70.00 | 2.0050 | 0.00 |
| 14.22 | 14220 | 70000 | 84220 | 84210 | 69990 | 69.99 | 2.0050 | −0.01 |
| 14.23 | 14230 | 70000 | 84230 | 84210 | 69980 | 69.98 | 2.0050 | −0.02 |
| 14.24 | 14240 | 70000 | 84240 | 84210 | 69970 | 69.97 | 2.0050 | −0.03 |
| 14.25 | 14250 | 70000 | 84250 | 84210 | 69960 | 69.96 | 2.0050 | −0.04 |
| 14.26 | 14260 | 70000 | 84260 | 84210 | 69950 | 69.95 | 2.0050 | −0.05 |
| 14.27 | 14270 | 70000 | 84270 | 84210 | 69940 | 69.94 | 2.0050 | −0.06 |
| 14.28 | 14280 | 70000 | 84280 | 84210 | 69930 | 69.93 | 2.0050 | −0.07 |

Those of skill in the art will appreciate that zero-loss leg pricing is not appropriate for every roundable spread. For example, the $0.21/bbl common multiple between CL and HU or HO is equivalent to $210/contract. Other possible spreads with contracts priced in other units may have larger common multiples. It is understood that the decision on when to use zero-loss leg pricing and when to use round-to-nearest-tick leg pricing depends on the business relationships between the exchange, the traders and the traders' firms. A threshold value may be used to prevent the leg pricer 207 from calculating zero-loss prices for new spreads where a very large common multiple would force the leg prices to extreme values that could affect the profit and loss accounting for traders whose trades included both outrights and spreads. In an implementation, the threshold is stored as a defined constant in a computer program with a value appropriate for the trading system.

The leg pricer 207 may perform round-to-nearest tick pricing for tradable combinations belonging to pattern category four in cases where the criteria for zero-loss pricing have not been satisfied. The anchor leg is chosen based on the last trade. The raw price of the other leg is calculated and rounded to the nearest tick in its contract. The gain and loss are always of equal magnitude in a two-order trade, so the intuitive rounding to the nearest tick will minimize the loss and the gain in the same operation.

An example is given in Table 7. As shown in Table 7, the resting order may be "Buy HO:CL at $14.00 barrel and the input order may be sell HO:CL at $14.00/barrel. Based on a previous trade, the leg pricer 207 may determine that the anchor leg is HO. The raw leg prices may be HO ($2.0001/gallon) and CL ($70.0042/barrel). The leg pricer 207 may round CL to $70.00. In this case, the seller of CL (the resting spread) receives $70,000.00 instead of $70,004.20, which corresponds to a loss of $4.20 to the seller and a gain of $4.20 to the buyer of CL (the input spread). As a result, this is the nearest tick, and has the least gain/loss. Alternatively, CL may be rounded to $70.01. In this case, the seller of CL (the resting spread) receives $70,010.00, instead of $70,004.20, which corresponds to a gain of $5.80 to the seller and loss of $5.80 to the buyer of CL (the input spread).

TABLE 7

Round-to-Nearest-Tick Pricing

| | |
|---|---|
| Resting Order: | Buy HO: CL @ $14.00/barrel |
| Input Order: | Sell HO: CL @ $14.00/barrel. |
| Anchor: | HO $2.0001/gallon from a previous trade |
| Raw Leg Prices: | HO: $2.0001/gallon (=84.0042/barrel). |
| | CL: $70.0042/barrel |
| Possible roundings | CL: $70.00, the seller of CL (the resting spread) receives $70,000.00 instead of $70,004.20, a loss of $4.20 to the seller and gain of $4.20 to the buyer of CL (the input spread). This is the nearest tick, and has the least gain/loss. CL: $70.01, the seller of CL (the resting spread) receives $70,010.00 instead of $70,004.20, a gain of $5.80 to the seller and loss of $5.80 to the buyer of CL (the input spread). | e. Leg Pricing: Category Five

The leg pricer 207 may receive a tradable combination belonging to pattern category five, where there are two outrights and a single roundable spread along with any number of calendar spreads or other non-roundable spreads. In an implementation, combinations belonging to category five are considered to have price discovery. The leg pricer 207 records the times and prices of the leg trades as previously described. The leg pricer 207 may determine the price of each leg and report the prices to the ticker plant 140.

The leg pricer 207 may receive a tradable combination belonging to category five with the further property that only two outrights and a single roundable spread are present, as shown for example in FIG. 6. As previously mentioned, such a combination may only be formed when the price of the roundable spread is better than that implied by the two outrights. For example, Buy CL @$70.01/bbl, Sell RB @$2.0030/gal and Buy RB:CL @14.12 are tradable, as shown in Table 8. The spread trader was willing to pay out $14,120.00 to take the position in the spread but only had to pay out $14,116.00.

TABLE 8

Category Five Pricing without Rounding

| Ord # | Order | Price in Quoted Units | Price in $ for a Full Contract | Paid by Trader on Execution | Received by Trader on Execution | Net Change |
|---|---|---|---|---|---|---|
| 1 | Buy CL | $70.1/bbl | 70,010.00 | 70,010.00 | — | −70,010.00 |
| 2 | Sell RB | $2.0030/gal | 84,126.00 | — | 84,126.00 | 84,126.00 |
| 3 | Buy RB:CL | $14.12/bbl | 14,120.00 | 84,126.00 | 70,010.00 | −14,116.0 |

FIG. 7 illustrates how the addition of a non-roundable spread to the combination does not alter the requirement that the price of the roundable spread be better than that implied by the other contracts or the requirement that the leg prices be set without the possibility of rounding. Since there is only a single roundable spread present, any non-roundable spread or spreads added to the combination will be between the outrights and the single roundable spread. Non-roundable spreads may have the same tick size as their legs. Non-roundable spreads keep the calculated leg prices on-tick until the buy and sell ends of the roundable spread are reached, at which point the leg prices for the roundable spread are determined with no possibility of rounding.

f. Leg Pricing: Category Six

Leg pricer 207 may receive a tradable combination belonging to pattern category six, where there may be zero or two outrights and any number of roundable or non-roundable spreads. Leg pricer 207 may determine leg prices for the tradable combination of pattern category six.

The leg pricer 207 may receive a tradable combination from the matcher 204. In one embodiment, the tradable combination is received as a data structure corresponding to the nodes and edges shown, for example, in FIG. 5B, FIG. 6 or FIG. 7. Those of skill in the art will appreciate that programming languages such as Java or C++, in which the leg pricer 207 may be implemented, have a wide variety of simple and compound data types and access methods suitable for the operations described herein.

Leg pricer 207 may identify an anchor leg. If the tradable combination contains outrights then the anchor leg is the virtual outright. If the tradable combination does not contain outrights then the anchor leg is the leg in which the most recent trade with price discovery has occurred.

Leg pricer 207 may determine the anchor price at the anchor leg. If the tradable combination contains outrights then the anchor price at the virtual outright anchor leg is zero. If the tradable combination does not contain outrights then the anchor price is determined by first determining a raw anchor price and second determining an anchor price based on the raw anchor price, one or more properties of the tradable combination received from the Matcher and one or more properties of the contracts being bought or sold by the orders in the tradable combination. The raw anchor price is the price of the most recent trade in the anchor leg. If the tradable combination consists of a buy order and a sell order in a roundable spread contract that has been designated as a contract for zero-loss leg pricing then the anchor price may be adjusted from the raw anchor price to a nearby price in such a way that the leg prices will be on-tick, using the procedure previously described for a category four combination. It is understood that the raw anchor price may on occasion satisfy the criteria for zero-loss leg pricing and the "nearby price" may be the raw anchor price itself. If the tradable combination is not subject to zero-loss leg pricing then the anchor price may be set to the raw anchor price. It is further understood that comparing leg prices to criteria including but not limited to upper and lower price limits may result in a failure that could in principle be corrected by an adjustment of the anchor price, for example, where the leg price in a combination consisting entirely of spreads has exceeded an upper price limit by a small amount. Determining the anchor price may include adjusting the anchor price following the computation of leg prices.

Leg pricer 207 may convert the circuit form of the tradable combination into a chain with its origin at the anchor leg. The leg pricer 207 may use a computer programming language, such as Java or C++, which uses iterators, pointers, indexes, counters or similar forms of indirect reference rather than explicitly "splitting", "rotating", "copying" or otherwise operating directly on the data structure.

Figure 10:
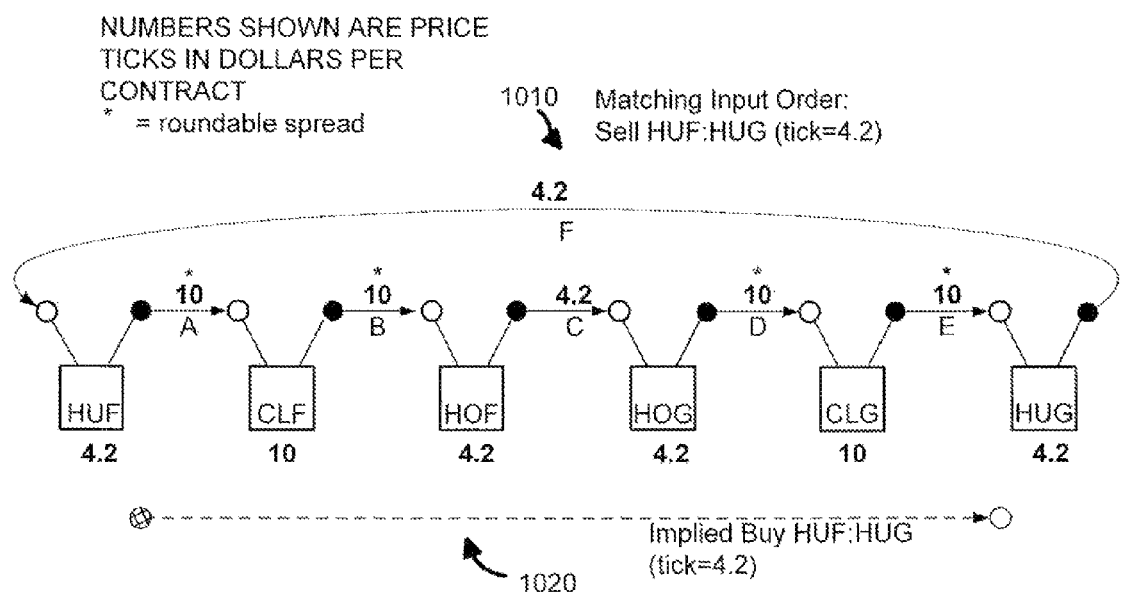
FIG. 10 illustrates one embodiment of a tradable combination showing the tick sizes in the order contracts and in the leg contracts.

An exemplary tradable combination is shown in FIG. 10. The tradable combination has the pattern XXCXXIC and belongs to category six. The incoming trigger order 1010 to sell calendar spread HUG:HUF is shown trading with implied order 1020 to buy HUG:HUF, made up of the five resting orders to buy HUF:CLF, sell HOF:CLF, buy HOF:HOG, buy HOG:CLG and sell HUG:CLG. It is understood that "buy HO:CL" has the same meaning as "sell CL:HO" and similarly for HU. It is further understood that writing HO or HU as the front leg expresses the exchange conventions that to buy the front leg is to buy the spread and that to buy a crack spread is to buy the distillate. The price of the trigger order for the purposes of leg pricing is determined by summing the prices on the resting orders where the buy prices have been inverted as previously described. In order to more clearly identify the roundable spreads, the tick sizes for the spread contracts and the outright leg contracts are shown where prices normally appear. The roundable spreads are marked with asterisks and it can be seen that the tick sizes for these spreads are different from at least one of the ticks in their associated legs.

Figure 11:
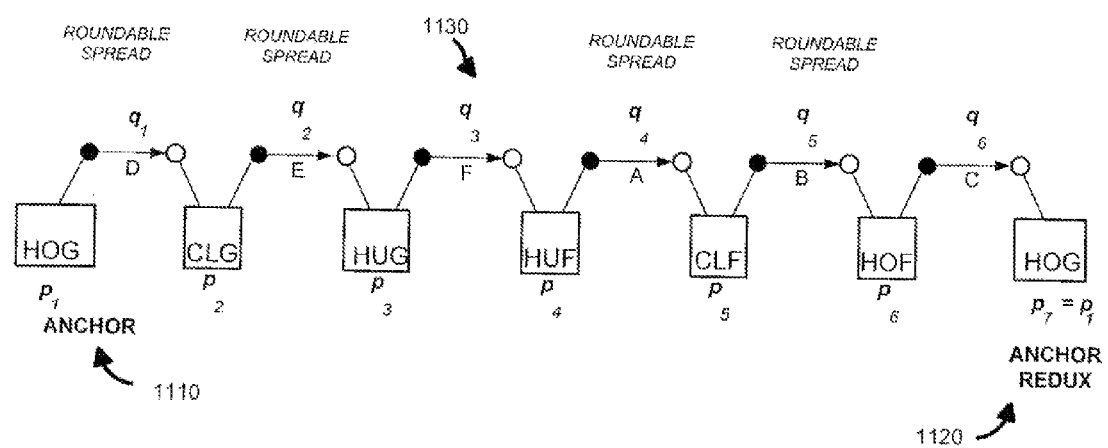
FIG. 11 illustrates one embodiment of a tradable chain.

In FIG. 11, an exemplary anchor leg has been chosen at the HOG leg 1110 based on, for example, the most recent price-discovered outright trade having taken place in the contract. The circuit has been split apart at the anchor leg and stretched out to form a chain. The anchor leg has also been added at the end of the chain as the "anchor redux" 1120 as a convenient way of expressing the constraint that the price at the end of the chain must be identical to the price at the beginning. The symbols $p_1, p_2, p_3, p_4, p_5, p_6$ and $p_7$ are used to represent the leg prices and the symbols $q_1, q_2, q_3, q_4, q_5$ and $q_6$ are used to represent the prices of the orders in the tradable combination. The trigger order 1010 in FIG. 10 appears as order 1130 in FIG. 11. The letters A, B, C, D, E and F adjacent to the spread orders indicate exemplary traders associated with these orders.

Leg pricer 207 may iterate the chain and determine the number of rounding scenarios that must be considered. It will be recalled that tradable combinations in category one, two, three and five have only one rounding scenario. Category four has one rounding scenario when zero-loss leg pricing is performed and two rounding scenarios ("round up" and "round down") otherwise. Leg pricer 207 begins with the anchor price $p_1$ and computes successive leg prices by applying the formula $p_{k+1} = \text{floor}(p_k + q_k, \text{tick}_{k+1})$, where the function floor (x,a) rounds x to the nearest multiple of a that is less than or equal to x. For example, floor (4.7, 0.25)=4.50 and floor (−3.1, 0.25)=−3.25. In FIG. 11, for example, $p_2$ is determined by adding $p_1$ and $q_1$ and rounding down to a multiple of $10, the price per tick in CL, it being understood that the sum of $p_1$ and $q_1$ may itself be a multiple of $10 so that the rounded price is just the sum itself. For every leg k+1, the spread trader gain $\Delta_k$ for the preceding spread from leg k to k+1 is calculated according to the formula $\Delta_k = (p_{k+1} - p_k) - q_k$. It is understood that $\Delta_k$ may take on positive or negative values and that a negative gain is equivalent to a loss.

In one embodiment, leg pricer 207 may calculate $\Delta_k$ to determine whether a given leg should be included in one or more rounding scenarios. The leg pricer 207 advances from one leg to the next until the anchor redux leg is reached at the end of the chain. At each leg, it determines whether the leg is a roundable leg according to the following three criteria: First, if the preceding spread is a roundable spread; second, if the price of the roundable spread is such that rounding is required at its sell end; and third, the roundable spread is not the final spread before the anchor redux. If all three criteria are met then the leg is a roundable leg. It is understood that in iterating a long chain that a rounded price may fall fortuitously on-tick, for example if the first roundable spread order and a subsequent roundable spread order are at prices where the movement "towards" and "away from" an on-tick price cancel each other out. As a result, the second aforementioned criterion is only applied until a roundable leg is found, after which every leg that follows a roundable spread prior to the last roundable spread is considered to be roundable. At the end of the iteration, the number of rounding scenarios N is calculated as $N = 2^n$, where n is the number of roundable legs. This formula (i.e., $N = 2^n$) indicates that the price at a roundable leg may be rounded up or down, i.e. there are two choices at each leg.

It is understood that on occasion, the anchor price and the order prices may be such that a calculated leg price at a roundable leg will be on-tick, in which case rounding up and rounding down have the identical result.

In one embodiment, the leg pricer 207 is used only on contracts such as those shown in Table 6 where most prices are likely to require rounding and there is little practical advantage in reducing the number of scenarios to evaluate in special cases. In an alternative embodiment, the leg pricer is used on contracts such as the NYMEX silver contract (symbol SI) where the calendar spread has a tick size of $5.00 and the outright has a tick size of $25.00, so that duplicate scenarios occur more frequently. The extension of the scenario counting logic to reduce or eliminate the evaluation of duplicate scenarios in leg pricers that are limited to such contracts is readily apparent. Those of skill in the art will appreciate that trading combinations in category one, category two, category three, category four with a zero-loss anchor price and category five will have zero roundable legs and therefore only one rounding scenario.

Figure 12A:
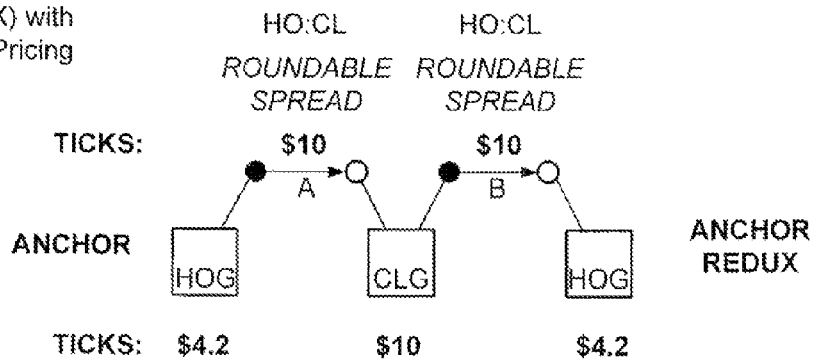
FIG. 12A and FIG. 12B illustrate another embodiment of a tradable combination.
Figure 12B:
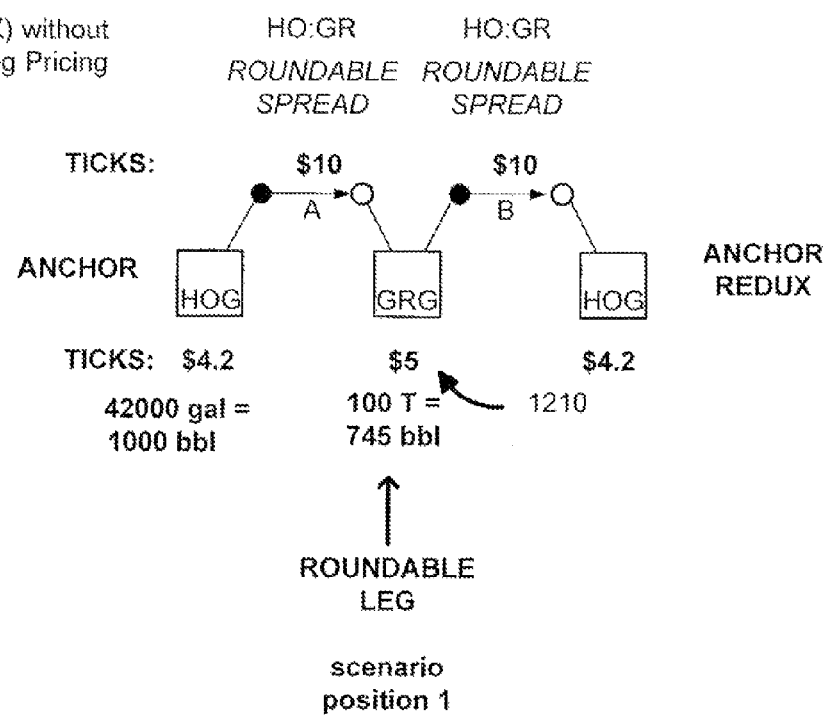

An example of a category five tradable combination with zero-loss leg pricing is shown in FIG. 12A for HO:CL and an example without zero-loss leg pricing is shown in FIG. 12B for HO:GR. In both HO:CL and HO:GR, there are two roundable spreads in the chain of which only the first leads to a potentially roundable leg. The tick sizes for HO and CL are based on the established pricing and contract sizes. The tick size 1210 for GR is shown in the diagram at $5.00, based on a contract definition for GR where the lot size is 100 metric tons (tonnes) and the tick is $0.05. Since there are 7.45 barrels per metric ton, a hypothetical 1:1 HO:GR spread trade would exchange 1000 barrels (42000 gallons) of heating oil for 745 barrels (100 tonnes) of Gasoil Rotterdam. This type of transaction changes a trader's effective position in petroleum distillates and is like an outright trade in combination with a true spread trade between contracts of equivalent value. In such a situation the traders might want the recorded leg trades to be as close to the fair market values as possible and zero-loss leg pricing would therefore not be used. In FIG. 12B, the GRG leg is identified as a roundable leg in scenario position one, where a decision must be made to round up or down. In other words, there are two scenarios: "0"="round the GRG leg price down" and "1"="round the GRG leg price up".

Figure 13:
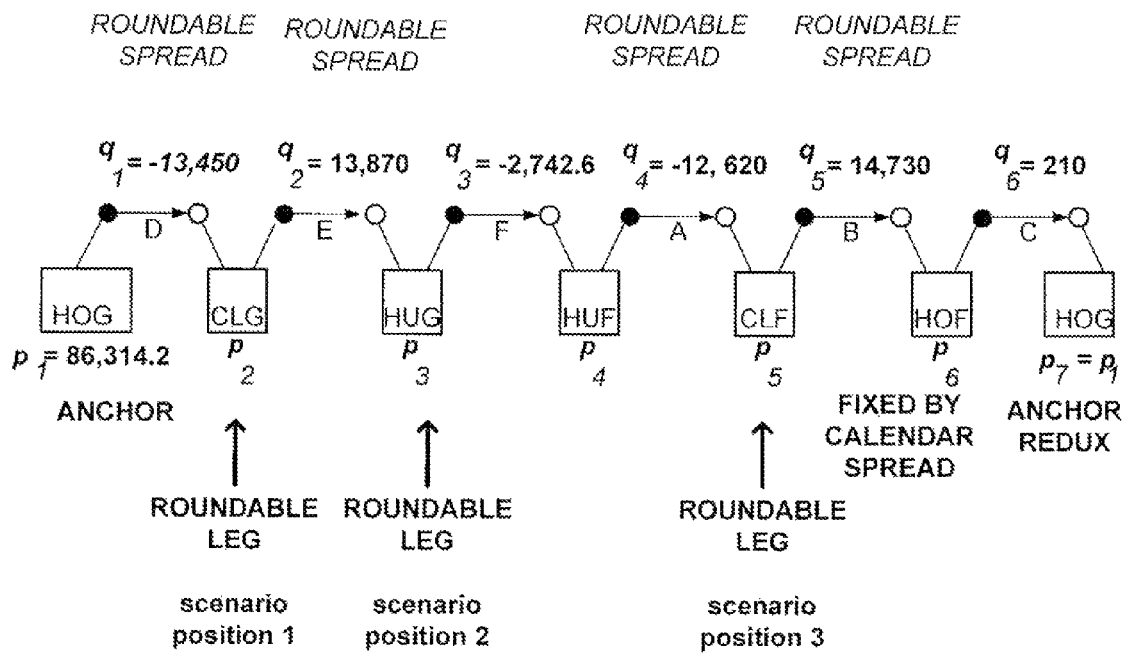
FIG. 13 illustrates another embodiment of a tradable combination.

The Leg Pricer 207 may set up internal data structures in order to evaluate the optimality metric for the rounding scenarios. FIG. 13 shows an example of the tradable combination of FIG. 10 and FIG. 11 with exemplary prices and the roundable legs identified. The order chain of FIG. 13 represents one of the data structures that will be used in evaluating the optimality metric. As previously mentioned, the Leg pricer 207 iterates the chain by starting at the left hand end and computing the price data required at each leg. The leg pricer 207 begins with the anchor price $p_1$ computes successive leg prices by applying one of three formulas to determine the price at the next leg. If leg k+1 is not a roundable leg then $p_{k+1} = p_k + q_k$. If leg k+1 is a roundable leg the formula depends on the rounding direction in the scenario being considered. If the direction is downwards then $p_{k+1} = \text{floor}(p_k + q_k, \text{tick}_{k+1})$. If the direction is upwards then $p_{k+1} = \text{ceiling}(p_k + q_k, \text{tick}_{k+1})$. These prices are used to calculate the trader gain (or loss) for each of the roundable spreads. Note that although the final roundable spread in the chain has its leg price fixed on the right hand side, its leg price on the left hand side will depend on prior roundings and that the final roundable spread will also have a trader gain (or loss).

In FIG. 13 there are three roundable legs and therefore eight (i.e. 2.sup.3) rounding scenarios. A rounding scenario may be expressed as a sequence of 1's and 0's where each position in the sequence corresponds to a roundable leg, i.e. a leg where rounding is possible. For example, a "0" may indicate a round down and a "1" may indicate a round up. In other words, a rounding scenario is a direction of rounding for a set of one or more roundable orders. The direction for each order may be up or down. In this manner the scenarios may be numbered from "000" (round down at every roundable leg) to "111" (round up at every roundable leg), since these correspond to decimal numbers 0 and 7. The eight scenarios may be numbered from zero to seven and these numbers may be used to index into one or more tables of prices, trader gains and partial calculations of one or more optimality metrics. An example such a table is shown in Table 9.

TABLE 9

Scenario Position Index and Rounding Direction

| Scenario | Scenario Position Index and Rounding Direction | | |
|---|---|---|---|
| | 1 CLG | 2 HUG | 3 CLF |
| 000 | down | down | down |
| 001 | down | down | up |
| 010 | down | up | down |
| 011 | down | up | up |
| 130 | up | down | down |
| 101 | up | down | up |
| 110 | up | up | down |
| 111 | up | up | up |

An example of iteration and price calculation is shown in Table 10. An anchor price of $2.0551 per gallon has been used for illustration, which equates to the $86,314.2 full contract price used in FIG. 13. The iteration starts with k=1 at the anchor leg and proceeds rightwards along the chain. For every leg k+1, the spread trader gain .DELTA . . . sub.k for the preceding spread from leg k to k+1 is calculated according to the formula .DELTA..sub.k=(p.sub.k+1-p.sub.k)-q.sub.k. It is understood that .DELTA..sub.k may take on positive or negative values and that a negative gain is equivalent to a loss. For example, scenario "000" starts with the leftmost leg at the anchor price and rounds downward at scenario position 1 (leg 2), scenario position 2 (leg 3) and scenario position 3 (leg 5). Trader D, who is buying the HO:CL spread, experiences a small negative gain of −4.2 when the CL selling price is rounded down. Trader E sees neither a gain nor a loss since this scenario fortuitously put both of his or her leg prices on-tick. Trader A experiences a large negative gain of −7.4. Trader B, whose roundable spread is the last in the chain, experiences a large gain of 14.2 because the downward roundings have accumulated to create a very low buy leg price for trader A's order to sell HOF:CLF (the CLF leg is the buy leg when this contract is sold). Table 10 shows the calculations of .DELTA . . . sub.k for all eight scenarios as well as the data required for two exemplary optimality metrics, namely scenario variance and minimum trader gain. In an implementation, the internal data structures used to evaluate the optimality metric may comprise all or part of Table 10.

TABLE 10

Scenarios Compared

| Order Position k | | 1 trader D | 2 trader E | 3 trader F | 4 trader A | 5 trader B | 6 trader c | 7 | var in trader gain sum of the squares of the partial gains $\Delta_K$ | min trader gain min $\Delta_K$ |
|---|---|---|---|---|---|---|---|---|---|---|
| Left Leg Contract | | HOG tick = 4.2 | | | | | | HOG redux tick = 4.2 | | |
| Spread price $q_K$ | | HOG:CLG | HUG:CLG | HUF:HUG | HUF:CLF | HOF:CLF | HOF:HOG | | | |
| Step/ Scenario | | −13,450 tick = 10 | 13,870 tick = 10 | −2,742.6 tick = 4.2 | −12,620 tick = 10 | 14,730 tick = 10 | 210 tick = 4.2 | | | |
| Scenario Position | | anchor $2.0551/ gallon | 1 | 2 | HUF is on-tick | 3 | fixed | anchor redux | | |
| 0 | $p_K$ | 86,314.2 | 72,860 | 86,730 | 83,987.4 | 71,360 | 86,126.2 | 86,314.2 | 274.04 | −7.4 |
| 000 | $\Delta_K$ | −4.2 | 0 | 0 | −7.4 | 14.2 | 0 | | | |
| 1 | $p_K$ | SAME | 72,860 | 86,730 | 83,987.4 | 71,370 | 86,126.2 | SAME | 42.04 | −4.2 |
| 001 | $\Delta_K$ | −4.2 | 0 | 0 | 2.6 | 4.2 | 0 | | | |
| 2 | $p_K$ | SAME | 72,860 | 86,730 | 83,987.4 | 71,360 | 86,126.2 | SAME | 274.04 | −7.4 |
| 010 | $\Delta_K$ | −4.2 | 0 | 0 | −7.4 | 14.2 | 0 | | | |
| 3 | $p_K$ | SAME | 72,860 | 86,730 | 83,987.4 | 71,370 | 86,126.2 | SAME | 42.04 | −4.2 |
| 011 | $\Delta_K$ | −4.2 | 0 | 0 | 2.6 | 4.2 | 0 | | | |
| 4 | $p_K$ | SAME | 72,870 | 86,738.4 | 83,995.8 | 71,370 | 86,126.2 | SAME | 87.48 | −5.8 |
| 130 | $\Delta_K$ | 5.8 | −1.6 | 0 | −5.8 | 4.2 | 0 | | | |
| 5 | $p_K$ | SAME | 72,870 | 86,738.4 | 83,995.8 | 71,380 | 86,126.2 | SAME | 87.48 | −5.8 |
| 101 | $\Delta_K$ | 5.8 | −1.6 | 0 | 4.2 | −5.8 | 0 | | | |
| 6 | $p_K$ | SAME | 72,870 | 86,742.6 | 84,000 | 71,380 | 86,126.2 | SAME | 74.04 | −5.8 |
| 110 | $\Delta_K$ | 5.8 | 2.6 | 0 | 0.0 | −5.8 | 0 | | | |
| 7 | $p_K$ | SAME | 72,870 | 86,742.6 | 84,000 | 71,380 | 86,126.8 | SAME | 74.04 | −5.8 |
| 111 | $\Delta_K$ | 5.8 | 2.6 | 0 | 0.0 | −5.8 | 0 | | | |

Figure 14:
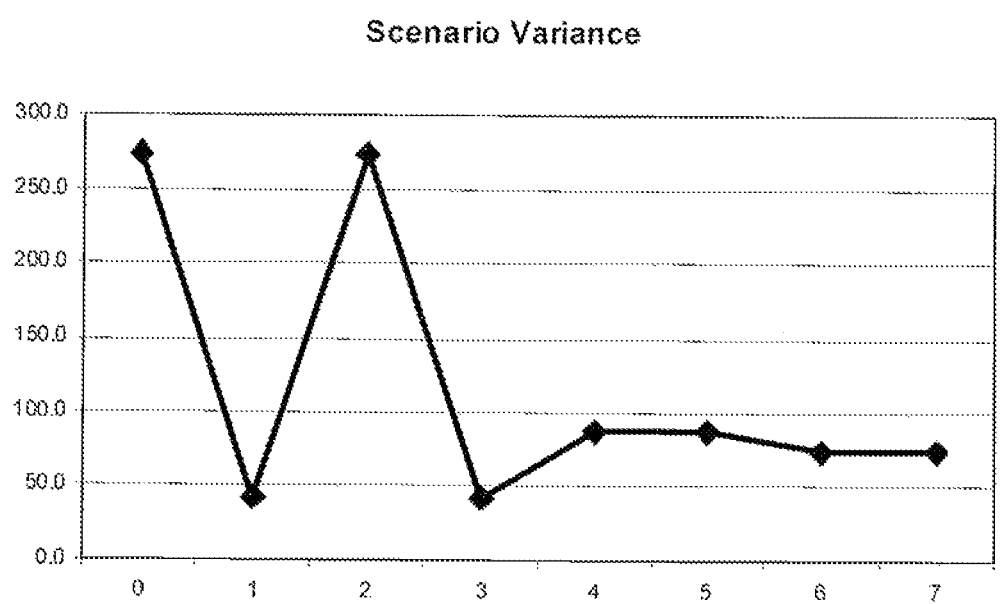
FIG. 14 illustrates one embodiment of various scenario variances.
Figure 15:
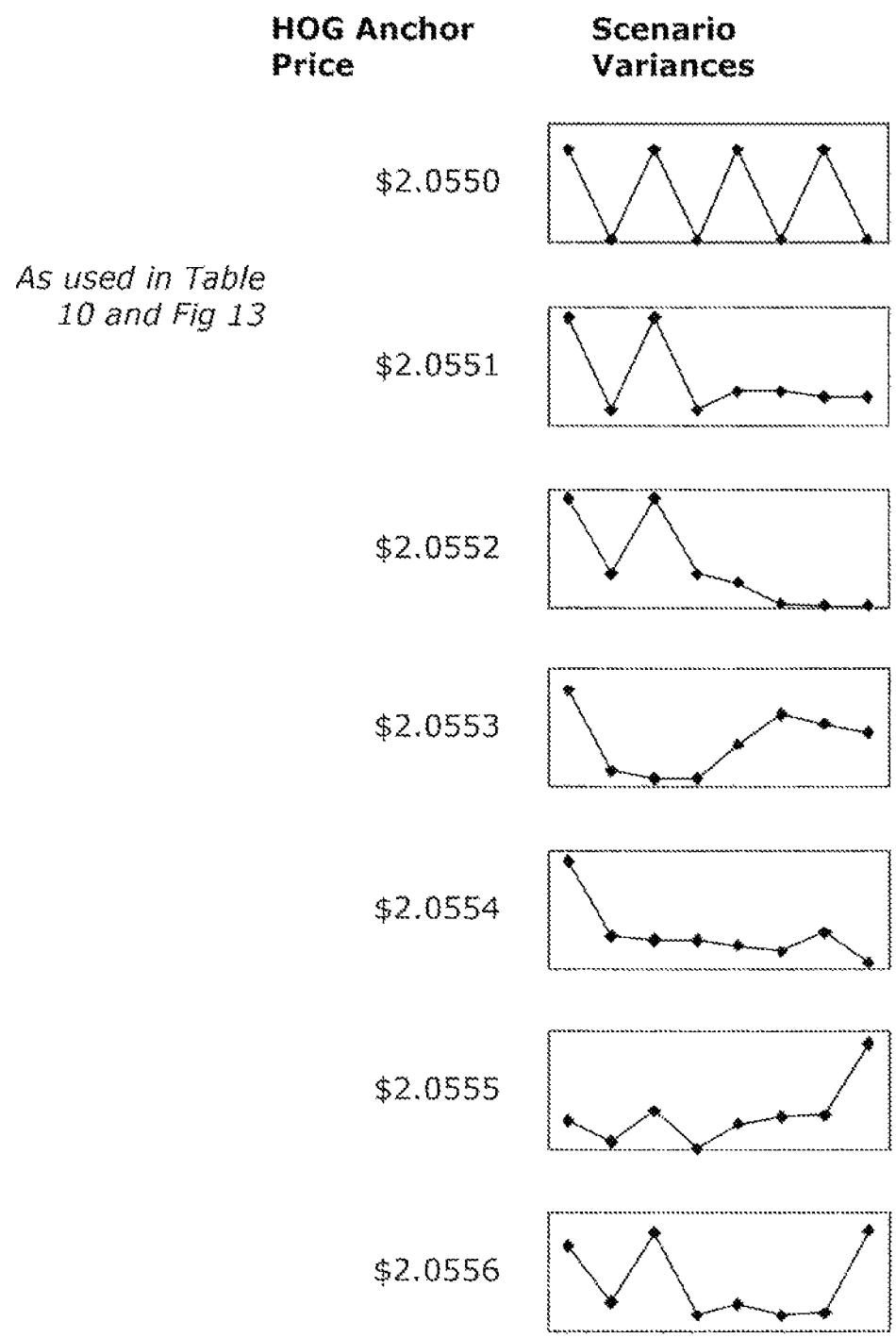
FIG. 15 illustrates one embodiment of various scenario variances and the dependence on the anchor price at the beginning of the corresponding tradable chain.

Leg pricer 207 may determine which of the rounding scenarios is the optimal rounding scenario, as determined by the minimization or maximization of a optimality metric. In one embodiment, the optimality metric is the sum of the squares of the trader gains, hereinafter referred to as the scenario variance. The determination of the optimal scenario is determined by calculating the scenario variances for all of the scenarios and comparing these variances until the lowest variance is found. This is considered optimal because squaring the gain causes large gains and losses to be penalized more heavily than small gains and losses, thereby preferring scenarios with many small gains and losses distributed as widely as possible. For example, FIG. 14 shows the scenario variances for the eight scenarios of Table 10 as they may be plotted after calculation. Of these, scenario 1 and scenario 3 have the lowest and identical value of 42.04. Either may be chosen as the fairest scenario and in an implementation the lowest numbered scenario is chosen ("first found and never bettered"). FIG. 15 shows a variety of scenario variances for anchor prices close to that used in Table 10 and FIG. 13. It can be seen that scenarios towards the middle of the horizontal axis are often the best, since these correspond to a mixture of upward and downward roundings. However, this is not always the case, and small changes in the anchor price can quickly change the lowest variance scenario.

In an alternative implementation, the leg pricer 207 may use the minimum trader gain as the optimality metric. Table 10 shows the result of the calculation, which for the prices used in the example will lead to the same "001" scenario being chosen as the best. Those of skill in the art will appreciate that a variety of optimality metrics can be defined, including but not limited to functions which prevent gains and losses of more than a tick and functions which prevent trader losses entirely. It is understood that optimality metrics that impose stricter criteria may require the matcher 204 to impose additional constraints on the tradable combinations that it passes to the leg pricer 207.

The leg pricer 207 may apply a rounding scenario to calculate the rounded prices and subsequently convert these prices to external prices that can be communicated to the other components of the trading system 130. This is accomplished by dividing by the contract size (1000 barrels in the example) and converting to the appropriate external unit (1 barrel=42 gallons). Table 11 shows the trade prices and leg prices for scenario 1 converted back to external units.

The leg pricer 207 may compare the calculated leg prices with criteria established for the trading system as a whole and made available to the leg pricer 207 through the core 203 and adaptation Layer 202. The criteria may include upper and lower limits for trades in outright contracts, possibly subject to price discovery, or requirements that trades in some outright contracts take place at non-negative values. Those of skill in the art will appreciate that failure to meet such criteria may be due to business or technical conditions that require the management of the exchange to intervene in the operation of the trading system. It is understood that any pre-programmed response to such conditions would normally be defined in a part of the system other than the leg pricer 207. However, this would not preclude an implementation of the leg pricer 207 from containing some of the required actions, such as turning off zero-loss leg pricing if the adjusted anchor prices were causing leg prices to exceed pre-established limits. Depending on the results of the comparison, the leg pricer 207 may either output the price data and return an indication of success to the matcher 204 or return an indication of failure to the matcher 204.

Leg pricer 207 may communicate the trades to the trading system using the adaptation layer 202. Those of skill in the art will appreciate that computer programming languages such as Java or C++ allow the implementation of design patterns appropriate for assembling a message from multiple locations within a component. An example of such a design pattern is the builder pattern. It is understood that the adaptation layer 202 may be used to output the required data.

Figure 16:
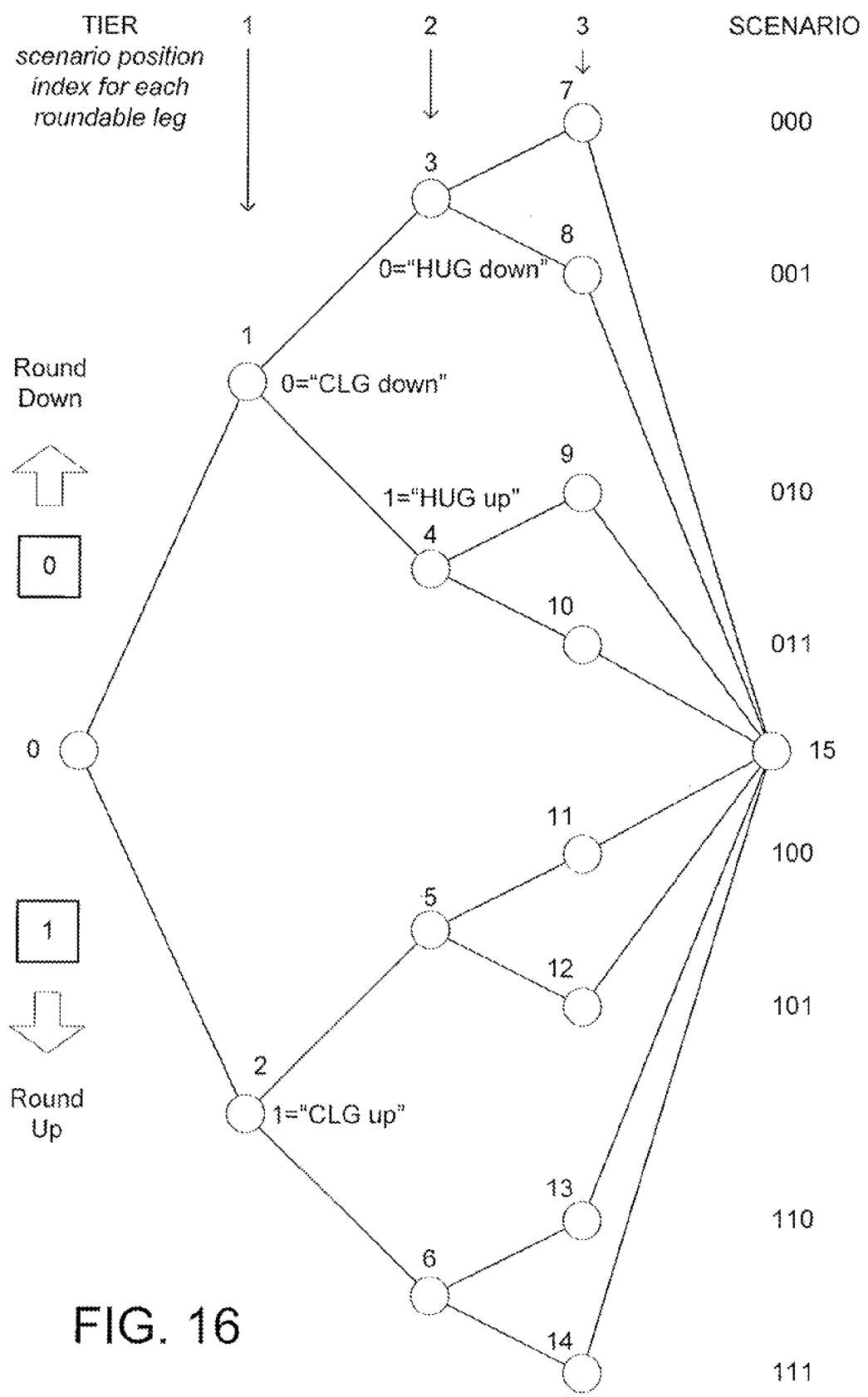
FIG. 16 illustrates one embodiment of grouping calculations.

In an alternative embodiment, leg pricer 207 utilizes the minimum scenario variance as the optimality metric but groups the calculations of squared gains so that redundant calculations are reduced or eliminated. For example, if there are three roundable legs and eight scenarios, calculating the squared gains at every leg in every scenario would require twenty-four (three times eight) calculations. However, it is clear that every scenario whose first step is an upward rounding will have the same squared gain at the first leg and that similar reasoning applies to the other directions and other legs. FIG. 16 illustrates that the calculations may be grouped so that only fourteen (two plus four plus eight) calculations are needed. Table 12 lists the scenarios, each of which results in a set of roundings and their partial variances, but also the leg price that precedes the anchor redux at the far end of the chain.

TABLE 11

| | | | External Prices | | | |
|---|---|---|---|---|---|---|
| Order | buy HOG:CLG | sell HUG:CLG | sell HUF:HUG | buy HUF:CLF | sell HOF:CLF | buy HOF:HOG |
| Trade Price | $13.45 | $13.87 | $-0.0653 | $12.62 | $14.73 | $-0.0050 |
| Leading Leg | $2.0551 | $72.86 | $2.0650 | $1.9997 | $71.37 | $2.0501 |
| Trailing Leg | $72.86 | $2.0650 | $1.9997 | $71.37 | $2.0501 | $2.0551 |

TABLE 12

Scenarios and Node Sequences in the Tree of FIG. 16

| Scenario | Sequence of nodes through the tree prior to node 15 | Scenario Position Index and Rounding Direction | | |
|---|---|---|---|---|
| | | 1 CLG | 2 HUG | 3 CLF |
| 000 | 0, 1, 3, 7 | down | down | down |
| 001 | 0, 1, 3, 8 | down | down | up |
| 010 | 0, 1, 4, 9 | down | up | down |
| 011 | 0, 1, 4, 10 | down | up | up |
| 100 | 0, 2, 5, 11 | up | down | down |
| 101 | 0, 2, 5, 12 | up | down | up |
| 110 | 0, 2, 6, 13 | up | up | down |
| 111 | 0, 2, 6, 14 | up | up | up |

The leg pricer 207 may represent the tree in a variety of ways. Those of skill in the art will appreciate that computer programming languages such as Java and C++ provide a variety of data types that may be used to represent trees and that the following description is only an illustration of how the data may be stored. For example, the tree may be represented as a node-indexed vector S[i] of predecessors, as shown in Table 13. It is understood that the structure of the tree is fixed but that the properties of its nodes may vary. In other words, the node-indexed vector of predecessors may be constructed when the leg pricer 207 itself is initialized but there may be other node-indexed vectors that hold the properties of the nodes that may change for each tradable combination.

To compute the values at the nodes for a specific tradable combination, the leg pricer 207 iterates the chain of orders rightwards from the anchor point. As it proceeds, it keeps an index i to represent which roundable leg it is currently working with. The value i=0 indicates that no roundable legs have yet been encountered. At each roundable leg, the leg pricer 207 performs the downward rounding first and continues on to the next node in the corresponding scenario. When there are no more nodes in the tree, it steps back through the predecessors to the first node for which no upward rounding has been performed. At that point it performs the upward rounding and advances through the tree performing downward roundings until there are no more nodes. The node whose price gives the best scenario variance when the final step to node 15 is considered becomes the predecessor of node 15 and the best scenario is determined. Those of skill in art will appreciate that the foregoing procedure corresponds to the well-known technique of traversing a binary tree "depth-first" and that other traversals may be readily implemented.

TABLE 13

Node Indexed Vector Predecessor Node "S" Table

| Node i | Preceding Node S[i] |
|---|---|
| 0 | 0 |
| 1 | 0 |
| 2 | 0 |
| 3 | 1 |
| 4 | 1 |
| 5 | 2 |
| 6 | 2 |
| 7 | 3 |
| 8 | 3 |
| 9 | 4 |
| 10 | 4 |

TABLE 13-continued

Node Indexed Vector Predecessor Node "S" Table

| Node i | Preceding Node S[i] |
|---|---|
| 11 | 5 |
| 12 | 5 |
| 13 | 6 |
| 14 | 6 |
| 15 | to be determined |

As the iteration advances, the leg pricer 207 may record the sums of the squared gains along each scenario as partial variances. In other words, each node may be assigned a weight equal to the partial variance up until that node, which will consist of the sum of the squared gains for all of the roundable spread traders whose orders preceded that node. It is understood that other optimality metrics may be evaluated in this manner, including but not limited to the minimum trader gain.

Those of skill in the art will appreciate that a variety of techniques can be used to avoid performing redundant operations. For example, the non-roundable spreads do not contribute gains and losses. In addition, it can be seen in Table 10 that the prices at the left leg of each roundable spread depend only the previous rounding decision, so that these prices may be kept in a node indexed vector.

In an alternative embodiment, the leg pricer 207 may use a roundable leg threshold to reduce the number of calculations in the optimal path algorithm. The number of rounding scenarios increases exponentially (as a power of 2). For example, a chain with 6 roundable spreads will have 5 roundable legs and 32 scenarios to test, a chain with 7 roundable spreads has 64, and so on. The "roundable leg threshold" may set the maximum number of roundable legs that will be used for scenario generation. If the number of roundable spreads exceeds the threshold, the leg pricer 207 will use an alternative "rounding of last resort" in place of optimal search. The threshold is determined by performance testing at the time of implementation. For example, the threshold may be set to seven (7), i.e. if there are more than 7 roundable spreads, then the alternative rounding algorithm will be used. This limits the number of roundable legs to 6 (one less than the number of spreads) and the number of scenarios to $64=2^6$. The roundable leg threshold may be either read from a configuration file or stored as a defined constant.

Figure 17:
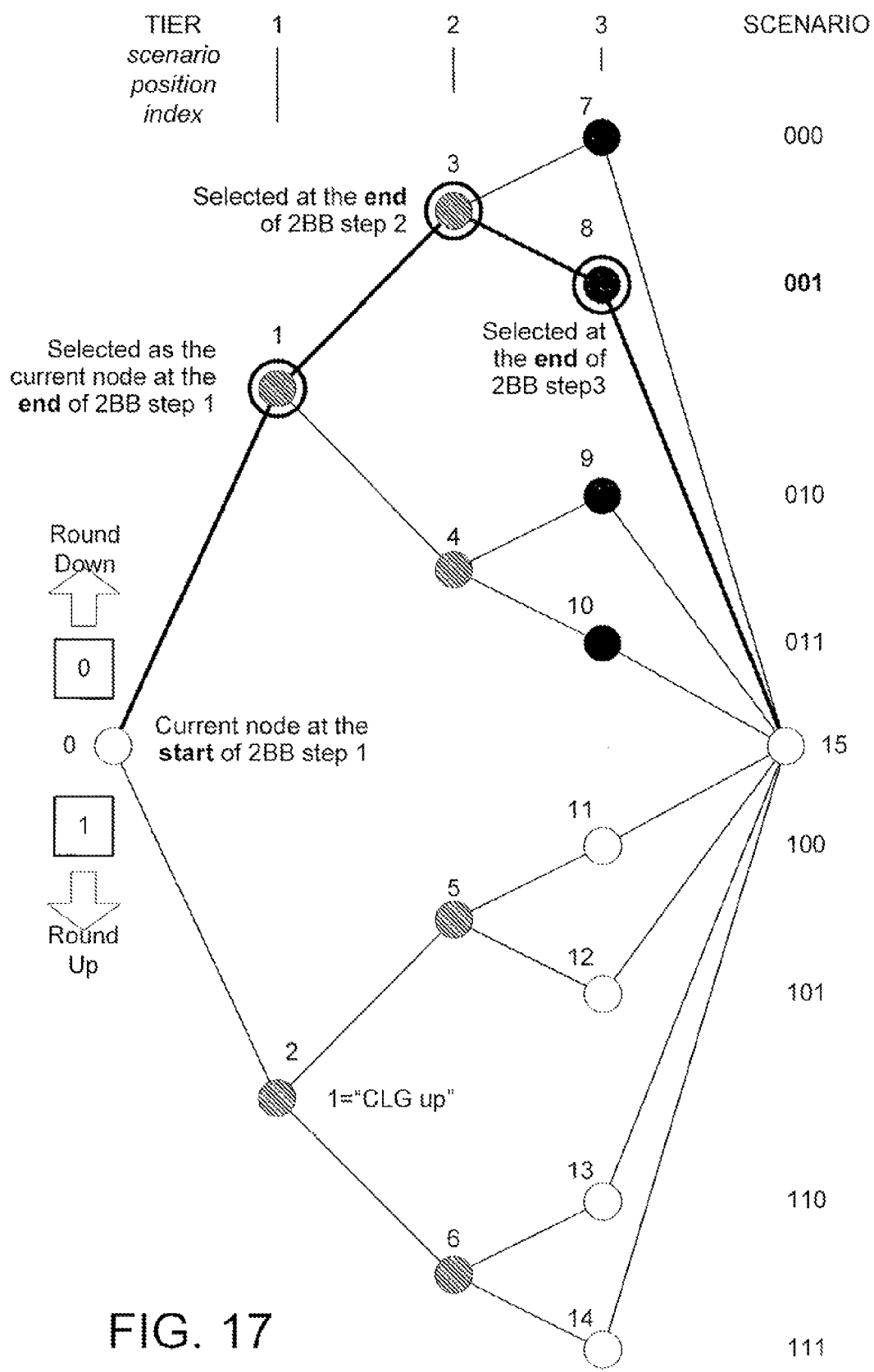
FIG. 17 illustrates one embodiment of reducing the number of calculations in order to obtain a faster but less exact result.

In an alternative embodiment, the leg pricer 207 may be configured to search only the parts of the tree most likely to result in the detection of the optimal scenario. For example, the depth-first search may be bounded so that only two steps beyond the current node are evaluated before retracing and that after the four successors to the current node have been evaluated, the current node is advanced to the immediate successor with the lowest partial scenario variance. This is referred to as the "two step branch and bound (2BB) algorithm" and its operation is illustrated in FIG. 17. The partial variances are calculated for nodes 1, 2, 3, 4, 5 and 6 in the first step (shown with crosshatching), from which 1 is selected as the successor of 0 in the "most likely to be best" scenario. In step 2, the partial variances are calculated at nodes 7, 8, 9 and 10, from which node 3 is selected as the successor to node 1. Finally, the full scenario variances are calculated using the trader gain in the final roundable spread between CLF and HOF for 7 and 8 as predecessors, since these are the only remaining successors to node 3 in the binary part of the tree.

Of these, node 8, is identified as having the best result. The selection of node 8 as the predecessor to node 15 identifies scenario 001 as the best scenario. The saving in calculation is significant in larger trees since only four new calculations are performed for each tier (roundable leg). In a tree with six tiers this results in 24 partial variance calculations instead of 126 for the tree method or 384 for a full table evaluation of all the scenarios.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 8:
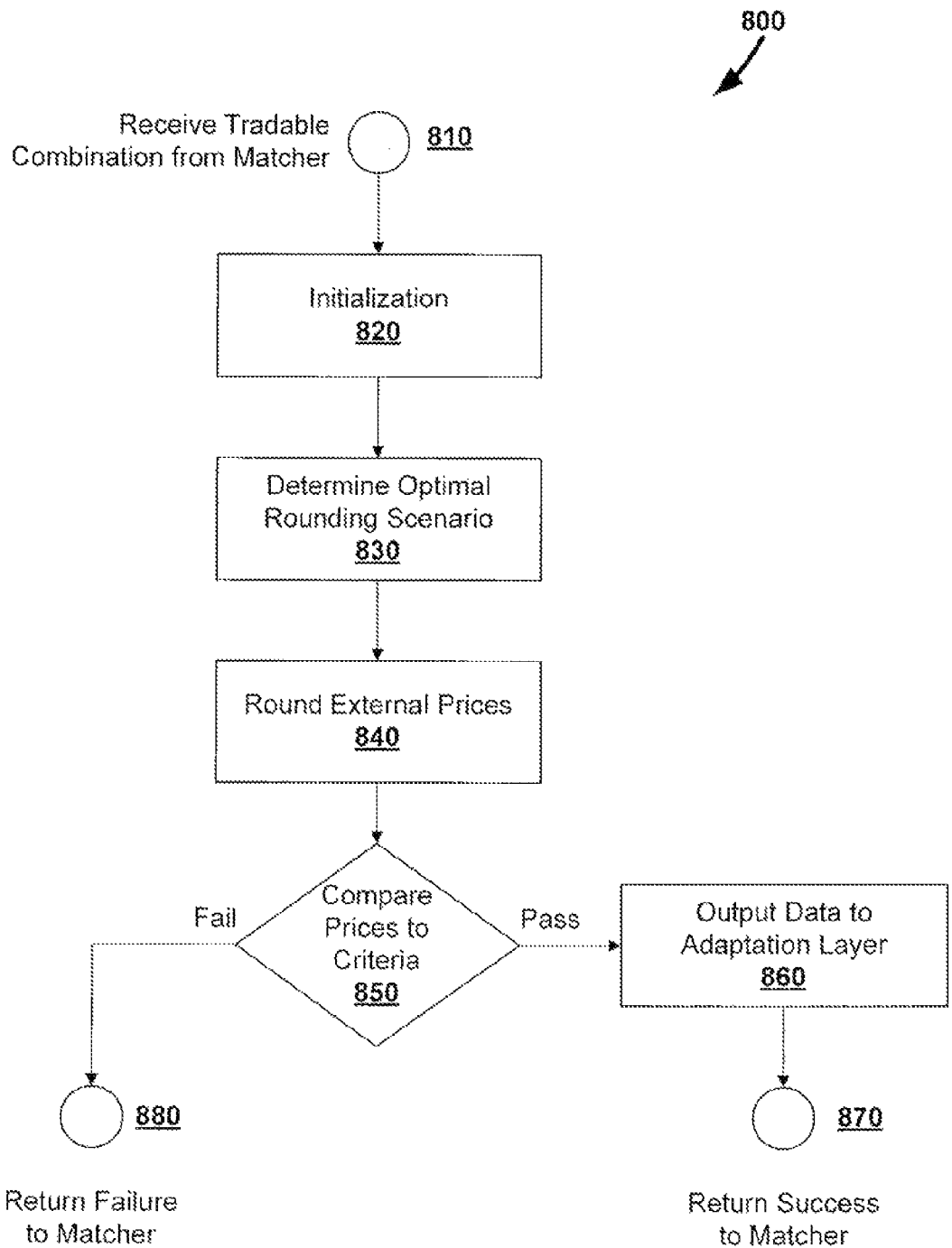
FIG. 8 illustrates one embodiment of a method for providing leg prices for a tradable combination.

FIG. 8 illustrates a method 800 for providing leg prices for a tradable combination of orders. The method may include the acts shown in FIG. 8. Additional, different or fewer acts may be provided. For example, method 800 may not include act 830. The method 800 may be implemented using the leg pricer of FIG. 2 or a different device or system. As shown in FIG. 8, the method 800 may include receiving a tradable combination from the matcher 810; initialization 820; determining the optimal rounding scenario 830; rounding the external prices 840: comparing the prices to criteria 850; and, depending on the results of the comparison, either outputting data 860 and returning an indication of success 870 or returning an indication of failure 880.

In act 810, a leg pricer may receive a tradable combination. In one embodiment, the tradable combination is received as a data structure corresponding to nodes and edges. The tradable combination may be, as discussed above, a category one combination, a category two combination, a category three combination, a category four combination, a category five combination, or a category six combination, it being understood that category six includes categories one through five as subcategories. In act 820, the leg pricer may perform initialization.

Figure 9:
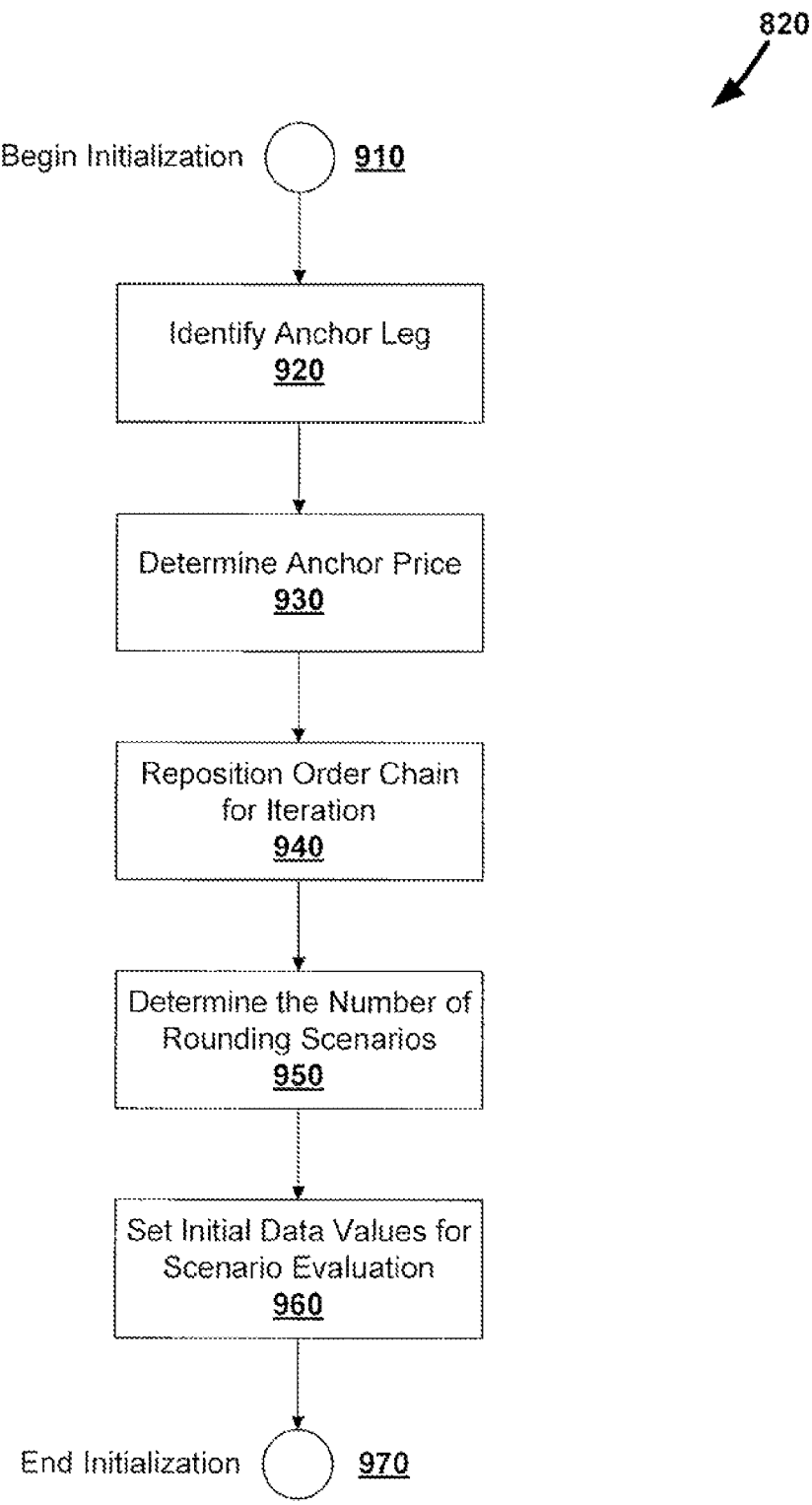
FIG. 9 illustrates one embodiment of a method for performing initialization.

FIG. 9 illustrates one embodiment of a method 900 for performing initialization. As shown in FIG. 9, initialization may include identifying an anchor leg 920; determining an anchor price 930; repositioning the order chain for iteration 940; determining the number of rounding scenarios to be considered 950; and setting, if necessary, the initial values in the data structures that will be used for evaluating the scenarios.

In act 920, a leg pricer may identify an anchor leg. If the tradable combination contains outrights then the anchor leg is the virtual outright. If the tradable combination does not contain outrights then the anchor leg is the leg in which the most recent trade with price discovery has occurred.

In act 930, the leg pricer may determine the anchor price at the anchor leg. If the tradable combination contains outrights then the anchor price at the virtual outright anchor leg is zero. If the tradable combination does not contain outrights then the anchor price is determined by first determining a raw anchor price and second determining an anchor price based on the raw anchor price, one or more properties of the tradable combination received from the Matcher and one or more properties of the contracts being bought or sold by the orders in the tradable combination. The raw anchor price is the price of the most recent trade in the anchor leg. If the tradable combination consists of a buy order and a sell order in a roundable spread contract that has been designated as a contract for zero-loss leg pricing then the anchor price may be adjusted from the raw anchor price to a nearby price in such a way that the leg prices will be on-tick, using the procedure previously described for a category four combination. It is understood that the raw anchor price may on occasion satisfy the criteria for zero-loss leg pricing and the "nearby price" may be the raw anchor price itself. If the tradable combination is not subject to zero-loss leg pricing then the anchor price may be set to the raw anchor price. It is understood that in act 850 the calculated leg prices may be compared to criteria established by the exchange, including but not limited to upper and lower price limits for outright trades. It is further understood that some failures to meet said criteria can in principle be corrected by a small adjustment of the anchor price that would be acceptable to the participating traders, for example where the leg price in a combination consisting entirely of spreads has exceeded an upper price limit by a small amount. Those of skill in the art will appreciate that act 930 can be readily extended to include further adjustments of the anchor price following the computation of leg prices.

In act 940, the leg pricer may convert the circuit form of the tradable combination into a chain with its origin at the anchor leg. Converting the circuit form may include using iterators, pointers, indexes, counters or similar forms of indirect reference rather than explicitly "splitting", "rotating", "copying" or otherwise operating directly on the data structure received in act 810. In act 950, the leg pricer may iterate the chain resulting from act 940 and determine the number of rounding scenarios that are to be considered. For example, category one combinations, category two combinations, category three combinations, and category four combinations include single rounding scenarios. In act 960 the Leg Pricer 207 sets up the internal data structures needed to evaluate the optimality metric for the rounding scenarios so that the optimal scenario can be determined.

In act 970 the initialization for the determination of the optimal rounding scenario has been completed. This is the final component act in act 820 of method 800.

Returning now to FIG. 8, in act 830, the leg pricer may identify the rounding scenario, which was identified in act 820, is the optimal rounding scenario as determined by the minimization or maximization of a optimality metric. In one embodiment, the optimality metric is the sum of the squares of the trader gains, hereinafter referred to as the scenario variance. The determination of the fairest scenario is determined by calculating the scenario variances for all of the scenarios and comparing these variances until the lowest variance is found. This is considered optimal because squaring the gain causes large gains and losses to be penalized more heavily than small gains and losses, thereby preferring scenarios with many small gains and losses distributed as widely as possible. In an alternative embodiment of act 830, the minimum trader gain is used as the optimality metric. In act 840, the optimal scenario, determined in act 830, is applied to the external prices.

In act 850, the calculated leg prices are compared with criteria established by the exchange for the trading system as a whole and made available to the leg pricer. The criteria may include upper and lower limits for trades in outright contracts, possibly subject to price discovery, or requirements that trade in some outright contracts take place at non-negative values. Those of skill in the art will appreciate that failure to meet such criteria may be due to business or technical conditions that require the management of the exchange to intervene in the operation of the trading system. It is understood that any pre-programmed response to such conditions would normally be defined in a part of the system other than the leg pricer. However, this would not preclude an implementation of the leg pricer from containing some of the required actions, such as turning off zero-loss leg pricing if the adjusted anchor prices were causing leg prices to exceed pre-established limits. Depending on the results of the comparison, the leg pricer may either return an indication of failure in act 880 or continue to act 860 and act 870.

In act 860, the leg pricer may communicate the trades to the trading system by means of the adaptation layer 202. Those of skill in the art will appreciate that computer programming languages such as Java or C++ allow the implementation of design patterns appropriate for assembling a message from multiple locations within a component. An example of such a design pattern is the builder pattern. It is understood that the adaptation layer 202 may be used to output the required data.

In act 870, the leg pricer may return a Boolean variable (i.e. true or false) to the matcher in order to indicate whether it has completed its calculations successfully and output the required data. In an alternative embodiment of acts 960 and 830, the leg pricer may utilize the minimum scenario variance as the optimality metric but group the calculations of squared gains so that redundant calculations are reduced or eliminated. For example, if there are three roundable legs and eight scenarios, calculating the squared gains at every leg in every scenario would require twenty-four (three times eight) calculations. However, it is clear that every scenario whose first step is an upward rounding will have the same squared gain at the first leg and that similar reasoning applies to the other directions and other legs.

In an alternative embodiment of acts 960 and 830, the leg pricer may be configured to search only the parts of the tree most likely to result in the detection of the optimal scenario. For example, the depth-first search may be bounded so that only two steps beyond the current node are evaluated before retracing and that after the four successors to the current node have been evaluated, the current node is advanced to the immediate successor with the lowest partial scenario variance. This is referred to as the "two step branch and bound (2BB) algorithm".

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

We claim:

1. An apparatus comprising:
an input operable to receive a first roundable spread order comprising two or more leg orders and a first price increment and a second roundable spread order comprising two or more leg orders and a second price increment, wherein the first price increment is different than the second price increment; and
a processor operable to calculate leg prices for each of the at least two or more leg orders of the first roundable spread order and the second roundable spread order, wherein the leg prices are multiples of the first price increment or the second price increment and wherein the processor is configured to round the leg prices according to an optimal rounding scenario distributing gains and losses between a first trader receiving the first roundable spread order and a second trader receiving the second roundable spread order.

2. The apparatus of claim 1, wherein the processor is operable to calculate a minimization of a sum of squares of differences between leg prices.

3. The apparatus of claim 1, wherein the processor is operable to calculate a minimization of a first loss experienced by the first trader receiving the first roundable spread order and a second loss experienced by the second trader receiving the second roundable spread order, wherein the first loss and the second loss are calculated using differences between leg prices.

4. The apparatus of claim 1, wherein the processor is operable to determine an anchor leg and an anchor price from which other leg prices are calculated by addition and subtraction of the prices of the other orders in a tradable combination including the first roundable spread order and the second roundable spread order.

5. The apparatus of claim 1, wherein the processor is operable to identify a tradable combination including the first roundable spread order and second roundable spread order.

6. The apparatus of claim 5, wherein the tradable combination include at least one additional order.

7. The apparatus of claim 6, wherein the processor is further operable to calculate the leg prices for the first roundable spread order and second roundable spread order in the tradable combination according to an optimal rounding scenario.

8. The apparatus of claim 7, further comprising: generating a tree that represents one or more rounding scenarios to be compared, the tree including a vertex for each of the rounding scenarios to be compared.

9. The apparatus of claim 7, further comprising:
identifying a rounding scenario with the smallest total variance; and
determining, by the processor, that the identified rounding scenario is the optimal rounding scenario.

10. The apparatus of claim 7, further comprising:
determining a weight vector for each vertex associated with each rounding scenario.

11. A computer implemented method comprising:
identifying, by a processor, a first roundable spread order comprising two or more leg orders and a first price increment and a second roundable spread order comprising two or more leg orders and a second price increment, wherein the first price increment is different than the second price increment;
determining, by the processor, an optimal rounding scenario for rounding leg prices of the two or more leg orders of the first roundable spread order and the second roundable spread order, wherein the optimal rounding scenario ensures that the leg prices are on-tick and that fractional gains and losses to each trader associated with the first roundable spread order and the second roundable spread order are minimized with respect to each other; and
rounding, by the processor, prices of the legs of the first roundable spread order and the second roundable spread order using the optimal rounding scenario.

12. The computer implemented method of claim 11, wherein determining the optimal rounding scenario includes:
determining, by the processor, the number of possible rounding scenarios based on the number of roundable spread orders identified.

13. The computer implemented method of claim 11, wherein determining the optimal rounding scenario includes:
generating, by the processor, a tree that represents one or more rounding scenarios to be compared, the tree including a vertex for each of the rounding scenarios to be compared.

14. The computer implemented method of claim 13, wherein determining the optimal rounding scenario includes:
determining, by the processor, a weight vector for the vertex associated with each of the rounding scenarios.

15. The computer implemented method of claim 11, wherein determining the optimal rounding scenario includes:
identifying, by the processor, the rounding scenario with the smallest total variance; and
determining, by the processor, that the identified rounding scenario is the optimal rounding scenario.

16. The computer implemented method of claim 11, wherein determining the optimal rounding scenario includes:
performing a graph theory operation.

17. The computer implemented method of claim 11, further comprising:
identifying a tradeable combination including the first roundable spread order and the second roundable spread order.

18. A non-transitory computer readable medium including instructions that when executed are operable to control a processor to:
identify a tradable combination including a first roundable spread order comprising two or more leg orders and a first price increment and a second roundable spread order comprising two or more leg orders and a second price increment, wherein the first price increment is different than the second price increment;
determine an optimal rounding scenario for rounding leg prices of the two or more leg orders of the first roundable spread order and the second roundable spread order, wherein the optimal rounding scenario ensures that the leg prices are on-tick and that fractional gains and losses to each trader associated with the first roundable spread order and the second roundable spread order are minimized with respect to each other; and
round the leg prices of the first roundable spread order and the second roundable spread order using the optimal rounding scenario.

19. The non-transitory computer readable medium of claim 18, the instructions further operable to cause a processor to:
generate a tree that represents one or more rounding scenarios to be compared, the tree including a vertex for each of the rounding scenarios to be compared.

20. The non-transitory computer readable medium of claim 18, the instructions further operable to cause a processor to:
identify the rounding scenario with the smallest total variance; and
determine that the identified rounding scenario is the optimal rounding scenario.

* * * * *

UNITED STATES PATENT AND TRADEMARK OFFICE
CERTIFICATE OF CORRECTION

PATENT NO. : 8,484,126 B2
APPLICATION NO. : 13/550315
DATED : July 9, 2013
INVENTOR(S) : Andrew Milne et al.

Page 1 of 1

It is certified that error appears in the above-identified patent and that said Letters Patent is hereby corrected as shown below:

On the Title Page:

Item (75) under Inventors:

please delete "Aleksander" and replace with --Aleksandr--.

Signed and Sealed this
Tenth Day of September, 2013

Teresa Stanek Rea
*Acting Director of the United States Patent and Trademark Office*